(12) United States Patent
Niemela et al.

(10) Patent No.: US 11,420,547 B2
(45) Date of Patent: Aug. 23, 2022

(54) DEPLOYABLE STORAGE SYSTEM FOR VEHICLES

(71) Applicant: NB4 Brand L.L.C., Chassell, MI (US)

(72) Inventors: Marcus Niemela, Scottsdale, AZ (US); Cal G. Niemela, Chassell, MI (US); Michael R. Jackson, Hancock, MI (US); Cole S. Stout, Dollar Bay, MI (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 17/072,374

(22) Filed: Oct. 16, 2020

(65) Prior Publication Data

US 2021/0031665 A1    Feb. 4, 2021

Related U.S. Application Data

(63) Continuation-in-part of application No. 16/849,376, filed on Apr. 15, 2020.
(Continued)

(51) Int. Cl.
*B60P 1/48* (2006.01)
*B60P 1/02* (2006.01)
(Continued)

(52) U.S. Cl.
CPC ............ *B60P 1/022* (2013.01); *A01K 1/0035* (2013.01); *A01K 5/02* (2013.01); *B60P 1/48* (2013.01); *B62D 63/08* (2013.01)

(58) Field of Classification Search
CPC .......... B60P 1/486; B60P 1/022; B60R 9/042; B60R 9/0423; B60R 9/0426
See application file for complete search history.

(56) References Cited

U.S. PATENT DOCUMENTS 238,243 A    3/1881  Mitchell
3,019,763 A  2/1962  Ferris
(Continued)

OTHER PUBLICATIONS

Brochure entitled "TNC Travel N Corrals, Lightweight Portable Corrals", published on or before Jul. 6, 2016.
(Continued)

*Primary Examiner* — Jonathan Snelting
(74) *Attorney, Agent, or Firm* — Gardner, Linn, Burkhart & Ondersma LLP

(57) ABSTRACT

A deployable hay pod elevator system for a transport trailer, such as a livestock trailer, provides a readily deployable hay pod, storage pod, or supply platform with the trailer, and is readily stowable above the trailer in a raised configuration for travel. The elevator system includes a deployable supply platform and a vertical raising and lowering mechanism or lift system configured to move the supply platform relative to the trailer. The lift includes a pivot arm system coupled to a sidewall of the trailer and a lift assist mechanism, such as a linear actuator, to vertically raise and lower the deployable supply platform. The elevator system includes a supply platform pivot actuation mechanism to adjust the angle of the platform relative to the pivot arm during stowage and deployment of the system. The elevator system may be fitted to various types of vehicles to store and transport various materials.

20 Claims, 21 Drawing Sheets

Related U.S. Application Data

(60) Provisional application No. 62/915,969, filed on Oct. 16, 2019, provisional application No. 62/834,443, filed on Apr. 16, 2019.

(51) Int. Cl.
  *B62D 63/08* (2006.01)
  *A01K 1/00* (2006.01)
  *A01K 5/02* (2006.01)

(56) References Cited

U.S. PATENT DOCUMENTS

| | | |
|---|---|---|
| 3,387,825 A | 6/1968 | Kreeger |
| 3,574,388 A | 4/1971 | Stone |
| 3,726,256 A | 4/1973 | Bernhardt et al. |
| 3,741,529 A | 6/1973 | Blagg |
| 3,828,733 A | 8/1974 | Correia |
| 3,943,890 A | 3/1976 | Calia |
| 3,970,045 A | 7/1976 | Graham, Jr. |
| 4,052,098 A | 10/1977 | Metz |
| 4,090,472 A | 5/1978 | York |
| 4,153,011 A | 5/1979 | Weissman et al. |
| 4,168,933 A | 9/1979 | Kane |
| 4,250,836 A | 2/1981 | Smith |
| 4,355,594 A | 10/1982 | Wagner |
| 4,468,046 A | 8/1984 | Rutherford |
| 4,494,733 A | 1/1985 | Olsson |
| 4,537,151 A | 8/1985 | Bolton |
| 4,659,136 A | 4/1987 | Martin et al. |
| 4,733,899 A | 3/1988 | Keys |
| 4,958,594 A | 9/1990 | Swagerty |
| 4,964,768 A | 10/1990 | Shomo |
| 5,104,280 A * | 4/1992 | Ziaylek .............. B60R 9/0423 280/4 |
| RE33,959 E | 6/1992 | Mollhagen |
| 5,235,468 A | 8/1993 | Stephens |
| 5,240,301 A | 8/1993 | Arnold |
| 5,261,779 A * | 11/1993 | Goodrich ............. B60P 1/4442 414/546 |
| 5,303,947 A | 4/1994 | Gerber |
| 5,361,929 A | 11/1994 | McLain et al. |
| 5,423,650 A | 6/1995 | Zerbst et al. |
| 5,427,486 A | 6/1995 | Green |
| 5,490,705 A | 2/1996 | Barr |
| 5,513,595 A | 5/1996 | Chatterton |
| 5,688,087 A | 11/1997 | Stapleton et al. |
| 5,715,641 A | 2/1998 | Hall, Jr. |
| 5,738,037 A | 4/1998 | Mahan |
| 5,738,341 A | 4/1998 | Lease |
| 5,810,412 A | 9/1998 | Hall |
| 5,827,036 A * | 10/1998 | Steffes .............. A61G 3/0209 414/462 |
| 5,887,928 A | 3/1999 | Fenske |
| 5,924,385 A | 7/1999 | Cossel |
| 6,067,940 A | 5/2000 | Holder |
| 6,077,007 A | 6/2000 | Porter et al. |
| 6,206,624 B1 | 3/2001 | Brandenburg |
| 6,234,741 B1 * | 5/2001 | McDaniel ............. B60P 1/00 254/10 R |
| 6,257,558 B1 | 7/2001 | Levine et al. |
| 6,283,537 B1 | 9/2001 | DeVore, III |
| 6,467,433 B1 | 10/2002 | Stanton et al. |
| 6,477,985 B1 | 11/2002 | Mennenga et al. |
| 6,499,435 B2 | 12/2002 | Markham |
| 6,557,329 B2 | 5/2003 | Schmidt |
| 6,571,744 B1 | 6/2003 | Olson et al. |
| 6,595,496 B1 | 7/2003 | Langlie et al. |
| 6,622,436 B1 | 9/2003 | Kretsch |
| 6,662,751 B1 | 12/2003 | Rutter |
| 6,729,267 B2 | 5/2004 | Campbell |
| 6,755,155 B2 | 6/2004 | May |
| 6,863,029 B1 | 3/2005 | Neufelder |
| 6,866,252 B2 | 3/2005 | Pulliam |
| 6,895,897 B1 | 5/2005 | Culp |
| 7,004,525 B1 | 2/2006 | Turnbow |
| 7,325,513 B1 | 2/2008 | Velasquez |
| 7,350,480 B1 | 4/2008 | Hughes |
| 7,393,042 B2 | 7/2008 | Alfstad-Seibel et al. |
| 7,513,730 B2 * | 4/2009 | Goyanko ............. B60R 9/042 224/310 |
| 7,637,060 B2 | 12/2009 | Starheim et al. |
| 7,685,970 B1 | 3/2010 | Rains |
| 8,171,889 B2 | 5/2012 | Lindfors et al. |
| 8,281,969 B2 | 10/2012 | Schmidlkofer |
| 8,322,580 B1 | 12/2012 | Hamilton |
| 8,322,966 B2 | 12/2012 | Doskocil |
| 8,534,981 B1 * | 9/2013 | Bortz .................. B60P 1/4442 414/546 |
| 8,870,243 B2 | 10/2014 | Elkington et al. |
| 9,132,762 B1 | 9/2015 | Heath |
| 9,193,305 B2 * | 11/2015 | Kramer ................ B60R 11/06 |
| 9,290,130 B2 * | 3/2016 | Buller ................. B60R 9/10 |
| 10,206,369 B2 | 2/2019 | Niemela et al. |
| 10,405,516 B2 | 9/2019 | Niemela et al. |
| 2003/0209206 A1 | 11/2003 | Campbell |
| 2003/0209208 A1 | 11/2003 | Campbell et al. |
| 2017/0215373 A1 | 8/2017 | Ruetenik |
| 2018/0055001 A1 * | 3/2018 | Niemela ............. A01K 1/0005 |
| 2020/0305386 A1 | 10/2020 | Niemela et al. |

OTHER PUBLICATIONS

Website excerpts of Cimarron Trailer at cimarrontrailers.com/trailer-models/custom-options/concealed-hay-lift/, and screenshots of a video published on or before Dec. 2, 2014.

Co-Pending parent application as filed, U.S. Appl. No. 16/849,376, filed Apr. 15, 2020.

* cited by examiner

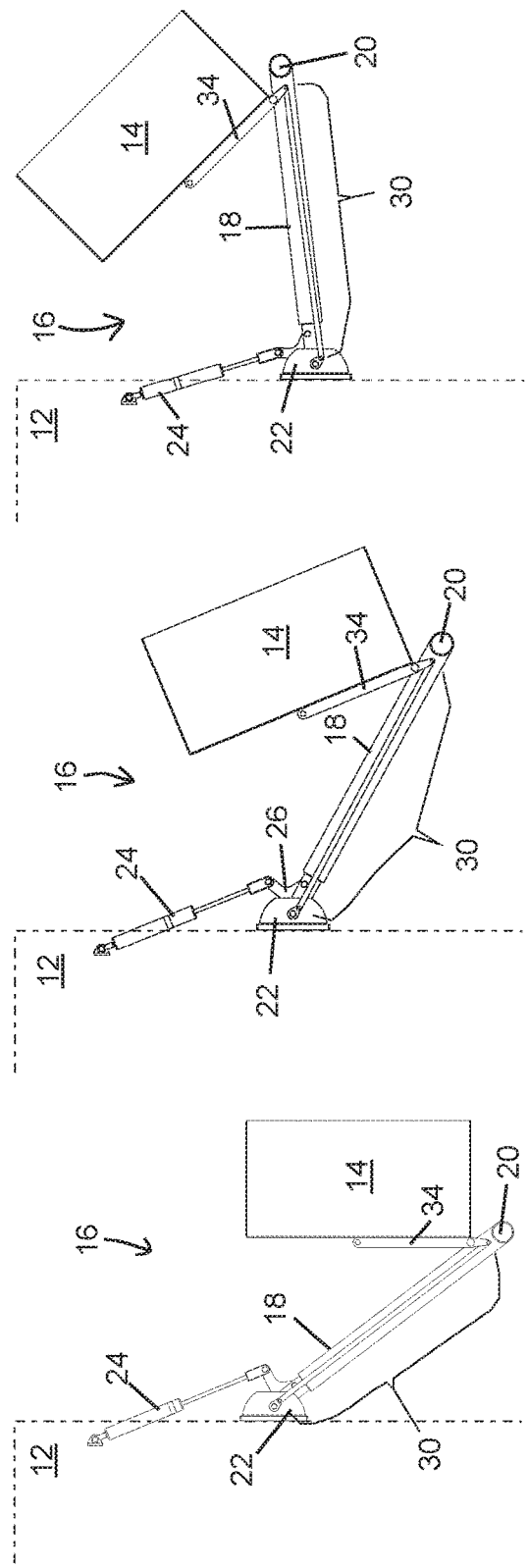
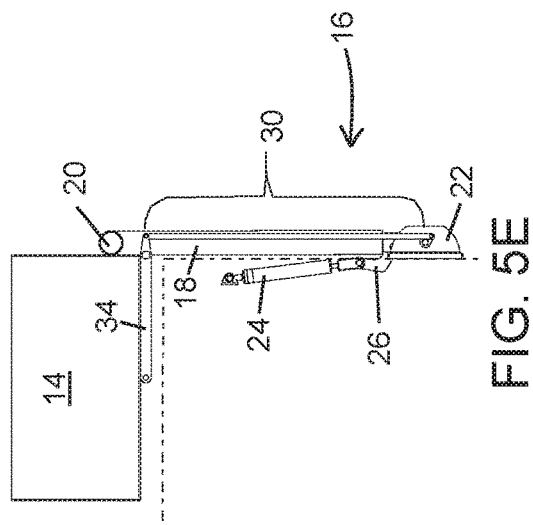
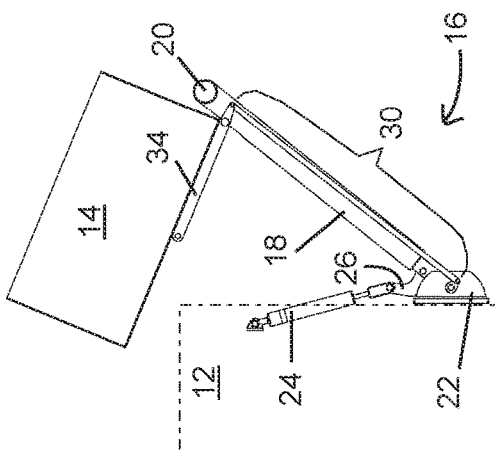
FIG. 5A  FIG. 5B  FIG. 5C  FIG. 5D  FIG. 5E

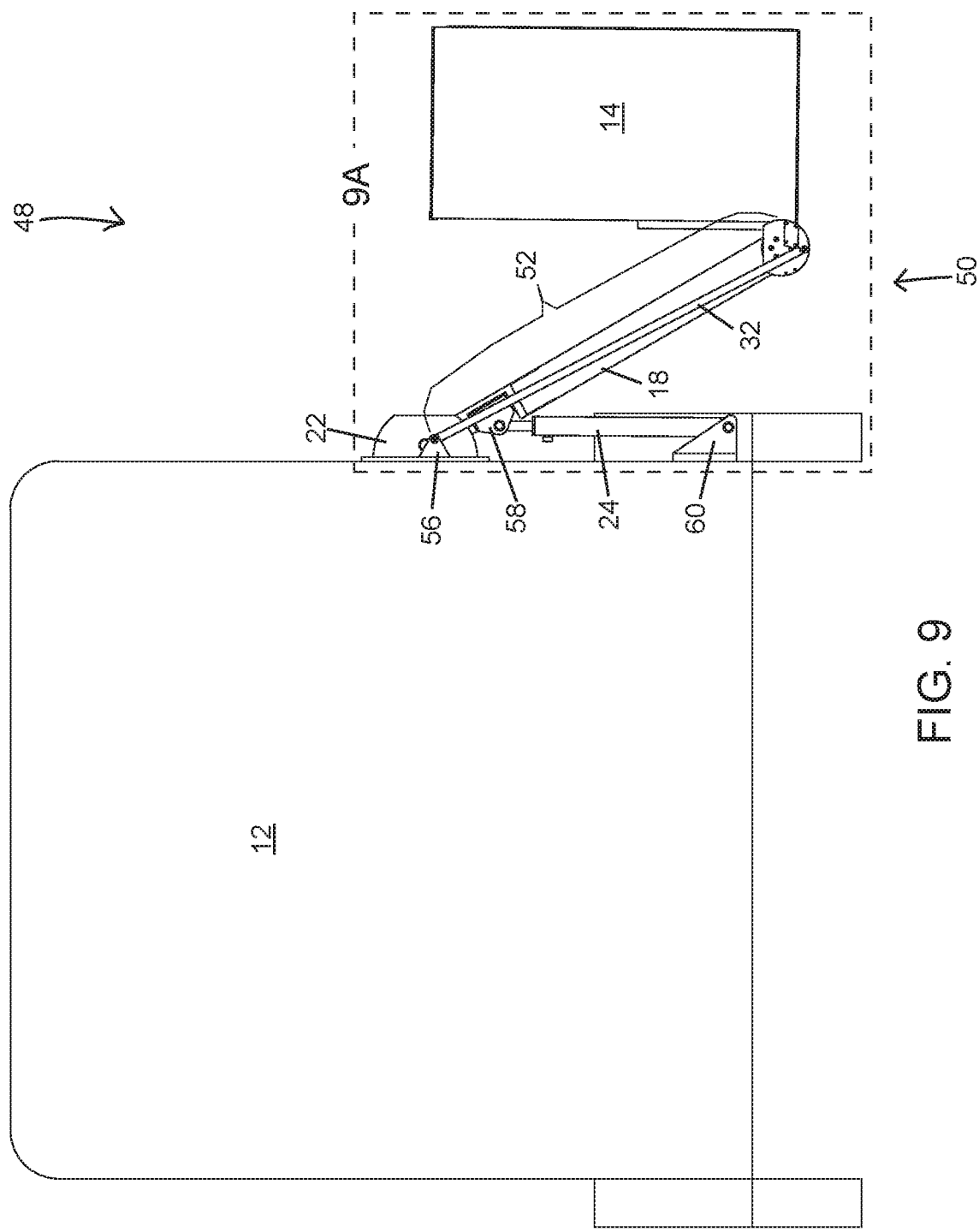

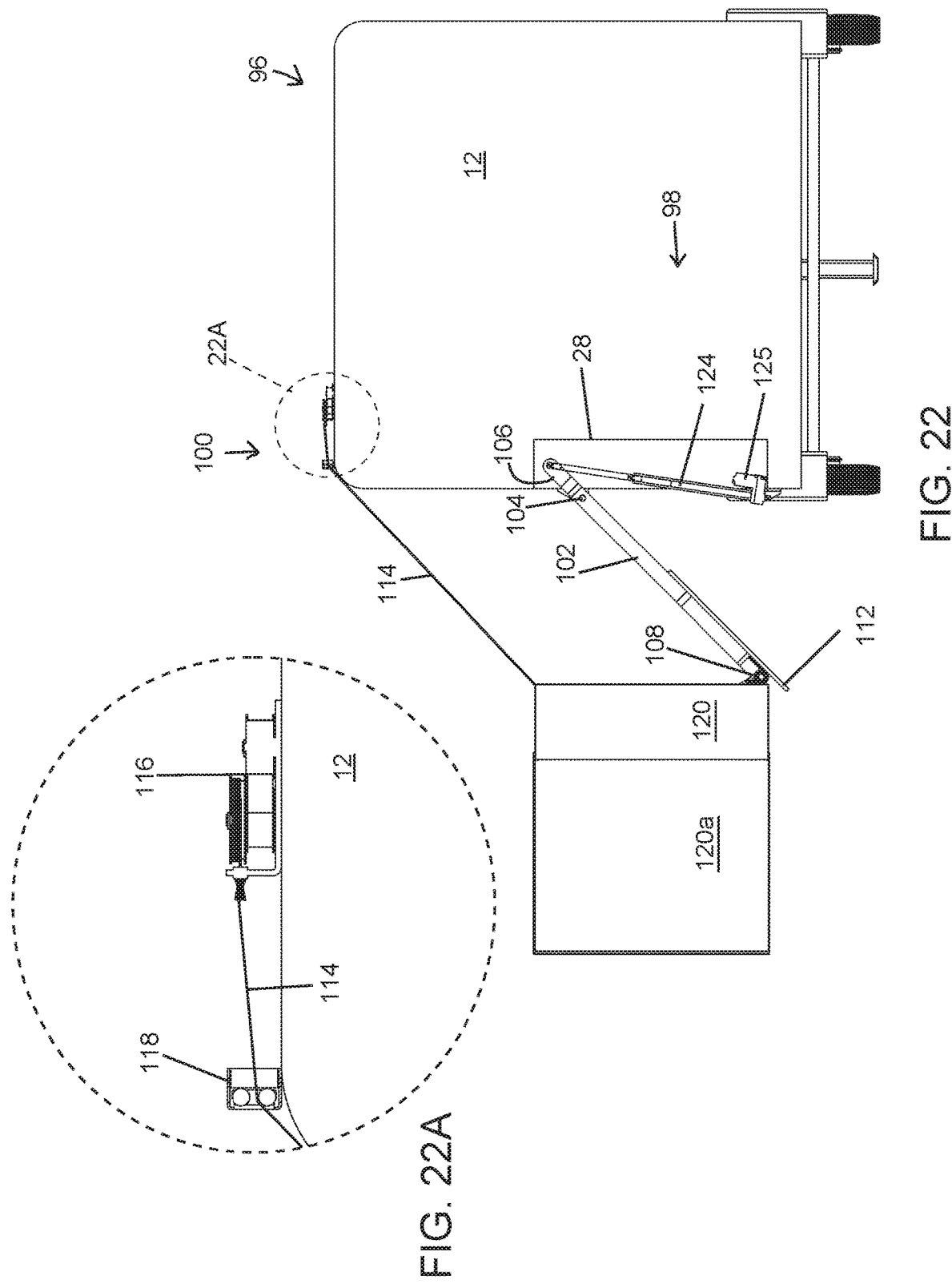

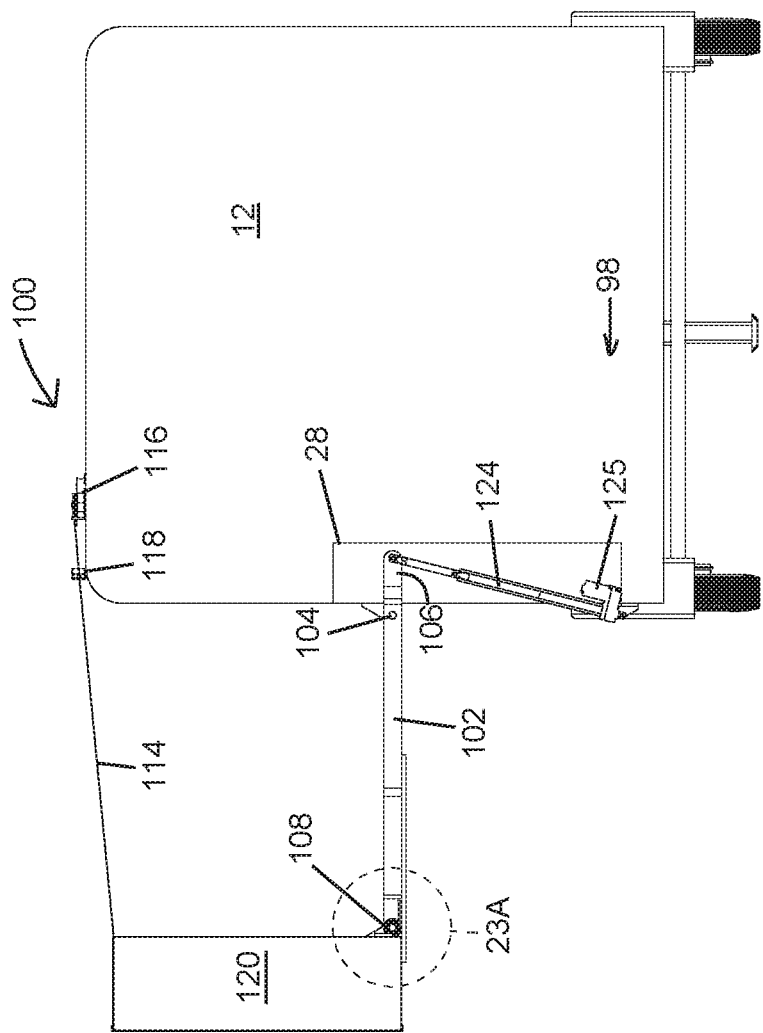
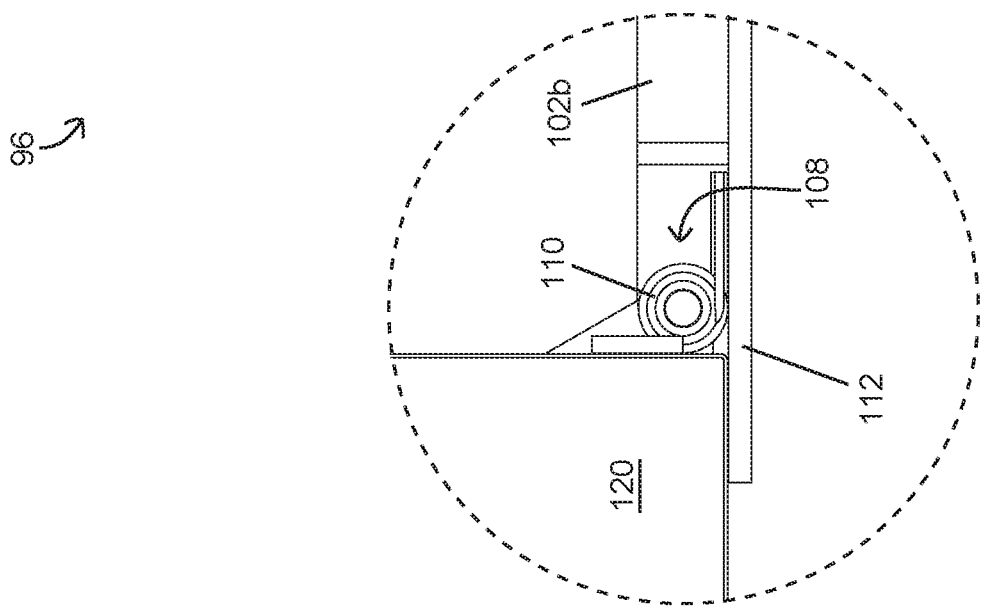

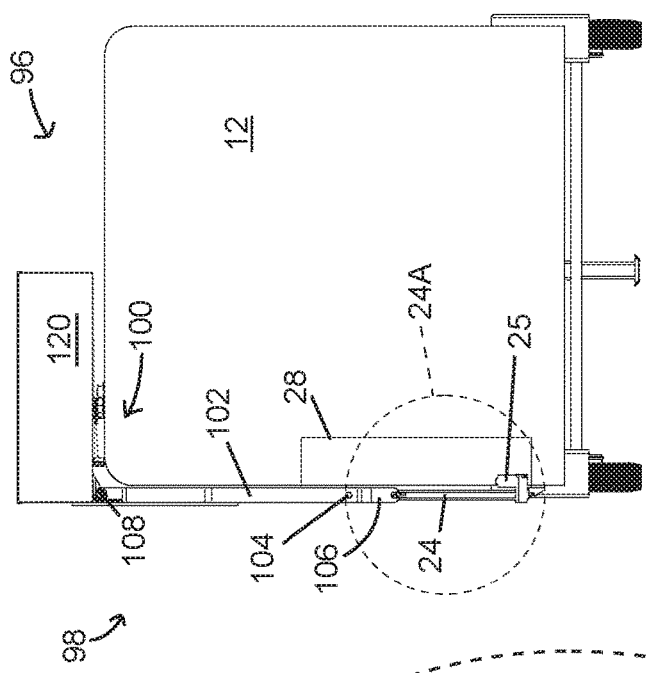
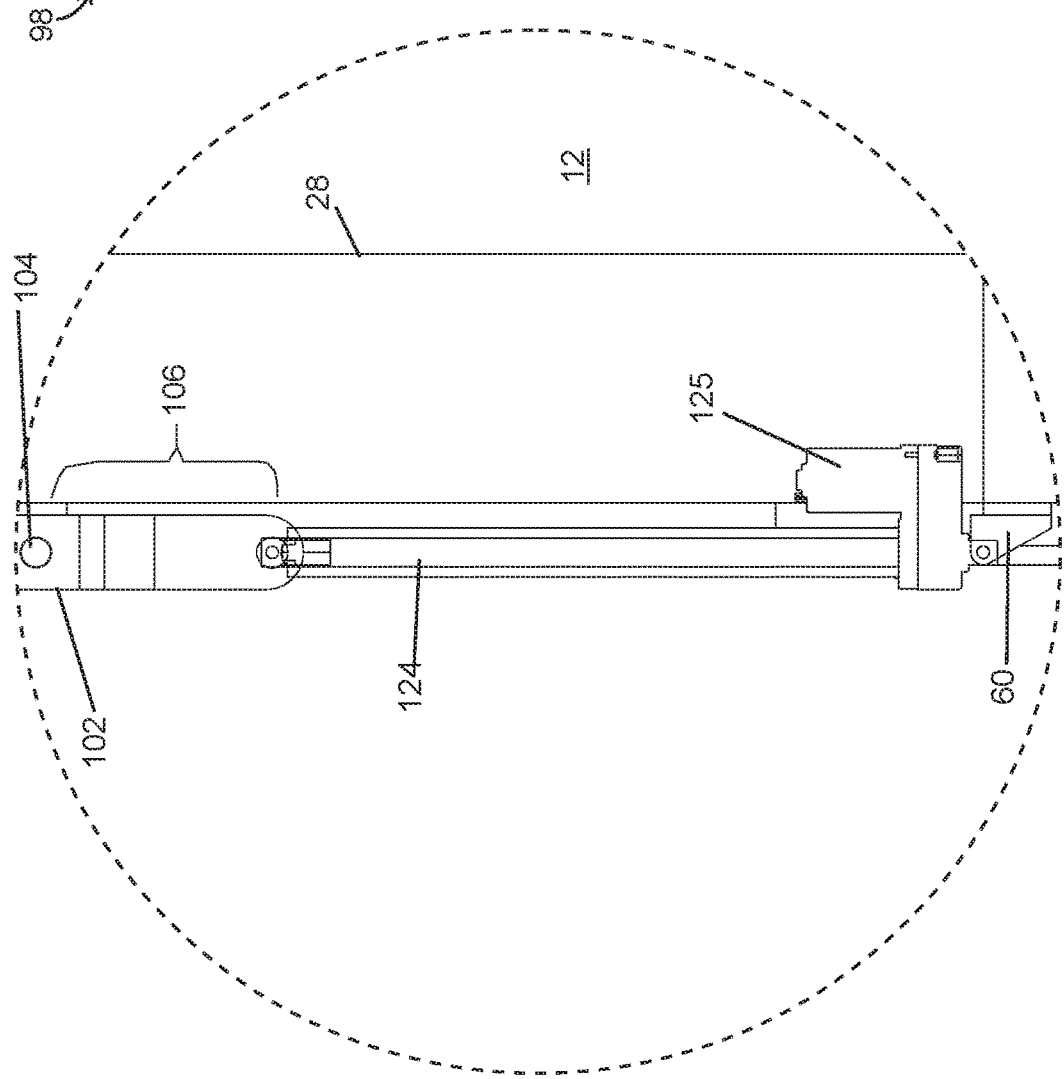
FIG. 24
FIG. 24A

DEPLOYABLE STORAGE SYSTEM FOR VEHICLES

CROSS REFERENCE TO RELATED APPLICATIONS

The present application claims priority of U.S. provisional application Ser. No. 62/915,969 filed Oct. 16, 2019, and is a continuation-in-part of U.S. patent application Ser. No. 16/849,376 filed Apr. 15, 2020, which claims priority from U.S. provisional application Ser. No. 62/915,969 filed Oct. 16, 2019 and from U.S. provisional application Ser. No. 62/834,443 filed Apr. 16, 2019, which are all hereby incorporated herein by reference in their entireties.

FIELD OF THE INVENTION

The present invention relates to storage systems for recreational vehicles, work vehicles, trailers, and the like.

BACKGROUND OF THE INVENTION

Those who move livestock, goods, or materials over-the-road from one location to another, for reason of work, hobby or show, or recreation, typically do so using towable trailers especially designed for this purpose. Some trailers, such as horse trailers, have provisions to accommodate one or more animals in a main compartment, and provide storage areas for other goods such as feed (e.g., hay) as well as saddles, bridles, blankets, and other horse-related equipment known generally as "tack". In addition, when horses are being transported over longer distances and for a period of several days, hay, water, and bedding (e.g., wood shavings) are also carried in or on the trailer or the tow vehicle. Some known horse trailers have a designated roof top area where several bales of hay can be stored. However, various other types of vehicles such as work vehicles (trucks, vans, etc.), recreational vehicles (including self-powered camper RV's, boats, camping trailers and toy haulers), often include storage bins for various goods, which bins may be accessible from outside the vehicles.

SUMMARY OF THE INVENTION

The present invention provides, in its various forms, a transport trailer with an integrated and deployable storage elevator for lifting and stowing supplies or feed, such as tack or hay. The integrated storage elevator can be deployed and retracted manually or automatically by means of an onboard motor such as an electrical power system or the like, which may be powered by a rechargeable battery, a combustion engine, or an electrical or pneumatic system, for example. The storage elevator includes a storage bin or supply handling platform that can be raised to an out-of-the-way storage location atop the trailer to which it is mounted, and the storage bin can be lowered or deployed to at least one side or to a front or rear of the trailer, where it can be conveniently accessed for loading, unloading, or storage while the trailer is parked. Optionally, the deployable storage elevator provides simplified push-button deployment and retraction, with heavy lifting and stowing of the storage bin handled by a deployment mechanism. The deployable storage elevator system provides a readily deployable storage bin along with the trailer. The system may be integrated into the trailer to provide one or more self-deploying and self-stowing storage bins, such as for overnight or short term use during travel with horses or other livestock, during camping activities, or the like. The elevator system vertically raises and lowers the storage bin alongside the trailer, and to pivot the storage bin to a stowed location atop the trailer.

In one form of the present invention, a deployable supply elevator system for a transport trailer includes a deployable supply handling platform or hay pod, a vertical raising and lowering mechanism, in the form of a hoist or lift, coupled to a portion of the trailer to raise and lower the platform between either a side, front, or rear of the trailer and the top of the trailer, and a handling platform actuation mechanism or assembly to actuate an orientation of the supply handling platform relative to the lift. The lift comprises at least one pivot arm pivotably coupled to the transport trailer, a handling platform support bar rotatably coupled to the pivot arm to support at least a portion of the handling platform, and an actuation assist mechanism coupled at one end to a portion of the trailer and at an opposite end to a portion of the pivot arm. The assist mechanism assists in deploying and stowing the elevator system and may be a gas-assisted shock The lift raises the platform from a deployed configuration proximate a lower portion of the trailer to a stowed configuration proximate an upper portion or roof of the trailer. The lift also lowers the platform from a stowed configuration proximate the upper portion of the trailer to a deployed configuration proximate the lower portion of the trailer, such as near the ground proximate the trailer where an operator or a livestock animal may access the contents of the platform. The pivot arm configuration defines an arcuate travel path along which the platform travels as it raises and lowers between the stowed and deployed configurations. The arcuate travel path extends from an upper portion of the trailer, such as at an upper portion of the sidewall or above the roof of the trailer, to a lower portion of the trailer proximate the ground surface that is adjacent the trailer.

In one aspect, the handling platform actuation mechanism is a linkage type actuation assembly that includes a linkage rod pivotably coupled at one end to a portion of the lift proximate a side of the trailer and pivotably coupled at the opposite end to a pivot actuation link. The pivot actuation link is pivotably coupled to a portion of the pivot arm at a pivot actuation pin such that a lever portion of the pivot actuation link extends between the connection with the linkage rod and the pivot actuation pin. A supply handling platform support portion of the pivot actuation link extends beyond the pivot actuation pin. The support portion is fixedly coupled to the supply handling platform. The linkage rod transfers an actuation force to the lever portion of the pivot actuation link to actuate the lever portion such that the support portion pivots, thereby pivoting the supply handling platform relative to the pivot arm. The linkage rod is coupled to the lift or trailer at a location that is spaced apart from the location that the pivot arm is coupled to the trailer. The distance between the linkage rod connection and the pivot arm forms a triangulating offset connection that automatically imparts an actuation force to the linkage rod during actuation of the vertical raising and lowering mechanism.

In another aspect, the linkage type actuation assembly comprises a linkage rod pivotably coupled to a portion of the side of the trailer and pivotably coupled at the opposite end to an actuation bracket, the actuation bracket is fixedly coupled to a portion of the handling platform support bar and rotates the handling platform support bar relative to the pivot arm in response to an actuation force transferred to the actuation bracket from the linkage rod In another aspect, the handling platform actuation assembly includes a chain-driven actuation mechanism or assembly that includes a plurality of sprockets, a plurality of gears, and a chain in communication with one another and all disposed along the pivot arm in spaced arrangement. The arrangement of the sprockets, gears, and chain is provided such that as the elevator system is moved between the stowed and deployed configurations, the chain-driven assembly automatically rotates the platform relative to the pivot arm.

In another aspect, the platform support bar is rotatable relative to the pivot arm and the platform is fixed to the handling platform support bar. One of the gears is fixed the handling platform support bar and automatically rotates the handling platform support bar relative to the pivot arm as the lift moves and the pivot arm moves relative to the trailer.

The chain-driven actuation assembly may include a fixed first sprocket disposed proximate a side portion of the trailer, a rotatable second sprocket disposed proximate a distal end portion of the pivot arm, and a chain routed around the first sprocket and the second sprocket that rotates the second sprocket in response to an actuation of the chain due to actuation of the vertical raising and lowering mechanism. The second sprocket is fixedly disposed on one end of a rotatable jack shaft that is disposed through a distal end portion of the pivot arm, a rotatable first spur gear is fixed to the opposite end of the jack shaft and is in geared engagement with a second spur gear disposed proximate the distal end of the pivot arm, the second spur gear is in geared engagement with a third spur gear that is fixedly disposed on a portion of the handling platform support bar. As the second sprocket is rotated, the jack shaft and first spur gear are also rotated. As the first spur gear is rotated, the second spur gear is rotated in an opposite direction of rotation relative to the first spur gear. As the second spur gear is rotated, the third spur gear is rotated in an opposite direction of rotation relative to the second spur gear. As the third spur gear is rotated the handling platform support bar and the supply handling platform are rotated relative to the vertical raising and lowering mechanism.

In yet another aspect, the handling platform actuation mechanism includes an extendable cable and a winch apparatus. A free end of the cable is attached to the hay pod, such as at an upper region of the hay pod, and the opposite end of the cable is retractably secured in the winch. The winch is configured to automatically pay out or retract the cable as the elevator system moves between the stowed and deployed configurations. In another aspect, the platform is pivotable relative to the pivot arm and the elevator system includes a torsion spring between the platform and the pivot arm. The torsion spring retains a minimum angle between the platform and the pivot arm as the elevator system moves between the stowed and deployed configurations. The torsion spring ensures that the hay pod will not collapse onto the pivot arm, particularly when the elevator system is at or near the stowed configuration. The cable and spring cooperate to automatically adjust the orientation of the hay pod relative to the pivot arm as the lift raises and lowers.

Accordingly, the deployable storage elevator of the present invention allows users to easily lift, stow, and deploy a storage bin containing supplies, such as hay, along the exterior of a vehicle such as a trailer, a recreational vehicle, a pickup truck, a pickup truck slide-in camper, a pickup truck bed rail, a pickup truck topper, an automobile roof top carrier, and various other motorized and non-motorized vehicles. The storage elevator can be actuated between raised, stowed, and lowered configurations using a drive system, such as a powered linear actuator that requires little more than pushbutton or remote actuation by an operator.

When the storage elevator is integrated into a vehicle such as a towable trailer or a motor vehicle, its various components can be recessed into channels in order to avoid significantly altering the vehicle's length or width, and the storage bin(s) can be stowed above the vehicle to avoid blocking access around the trailer or vehicle.

These and other objects, advantages, purposes, and features of the present invention will become more apparent upon review of the following specification in conjunction with the drawings.

BRIEF DESCRIPTION OF THE DRAWINGS

FIGS. 5A-5E are rear elevation views of the deployable hay pod elevator of FIG. 1, depicting sequential steps of stowing the deployable hay pod, and depicted with the trailer roof and sidewall partially shown in phantom;

FIG. 9 is a rear elevation view of the deployable hay pod elevator of FIG. 8;

FIG. 22 is a rear elevation view of the cable assisted deployable hay pod elevator and trailer of FIG. 21A;

FIG. 22A is an enlarged view of the region designated 22A in FIG. 22;

FIG. 23 is a rear elevation view of the trailer and cable assisted deployable hay pod elevator of FIG. 21B;

FIG. 23A is an enlarged view of the region designated 23A in FIG. 23;

FIG. 24 is a rear elevation view of the trailer and cable assisted deployable hay pod elevator of FIG. 21C; and FIG. 24A is an enlarged view of the region designated 24A in FIG. 24.

DETAILED DESCRIPTION OF THE PREFERRED EMBODIMENTS

Figure 1:
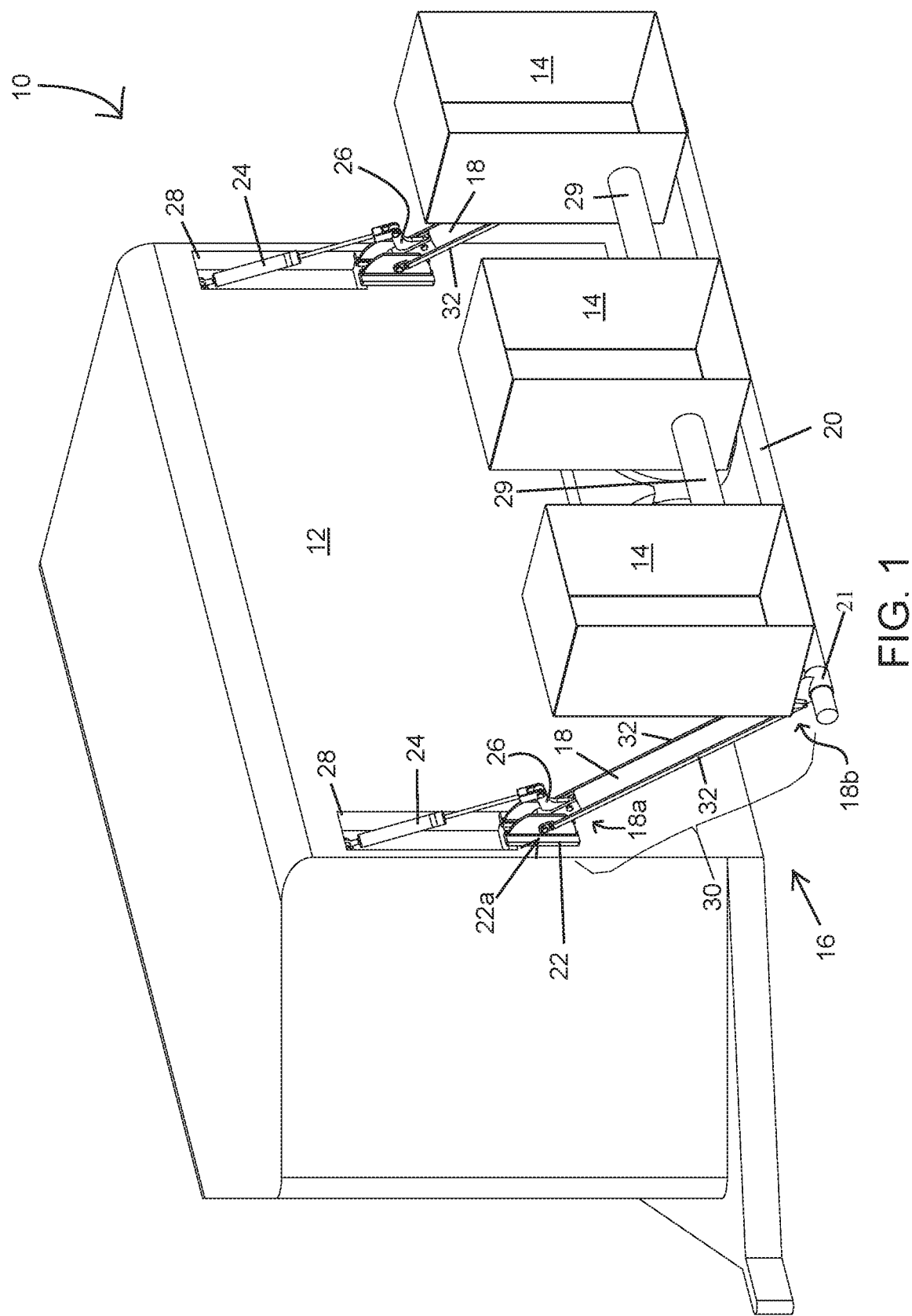
FIG. 1 is a front-side perspective view of a deployable hay pod elevator in accordance with the present invention, shown coupled to a transport trailer and in a deployed configuration.

Referring now to the drawings and the illustrative embodiments depicted therein, an integrated storage bin or hay pod elevator system 10 is provided for a transport trailer 12, such as a livestock trailer (FIG. 1). The system 10 includes a deployable supply handling platform that may be implemented as an open platform, a storage bin, or a hay pod 14, for example, and a pivotably extendable vertical raising and lowering mechanism, such as a hoist or lift 16, that raises and lowers the platform (described and illustrated herein as hay pod 14) relative to a front, side, or back of trailer 12, such as shown in FIGS. 1-5E. The hay pod elevator system 10 provides a storage space and deployment/retraction mechanism that allows users to access and store goods at a convenient height while the users are at ground level, and then can be actuated to raise the storage space to an elevated out-of-the-way location, typically atop the trailer 12. The actuation to raise and lower the storage space may be accomplished by powered actuators so that users need not lift goods onto or off of the elevated (e.g., rooftop) storage area, or may at least provide a mechanical advantage to reduce the effort required to manually raise the goods to the elevated storage area. In this manner, users can easily utilize elevated storage spaces that are not usually available or accessible without significant effort and/or an increased risk of falling from an elevated location. The elevator system 10 thus reduces lifting efforts required of users, and facilitates the secure elevated storage of goods at out-of-the-way locations.

It will be appreciated that while the term "hay pod" is used throughout this description, the hay pod 14 that is described and illustrated in the present application is representative of substantially any form of storage bin or platform for storage of various items, any of which can be considered a "platform". It will also be appreciated that one or many hay pods 14 may be supported on the lift, and that one or more lifts 16 may be provided at opposite or adjacent sides of the trailer 12 to provide additional storage spaces. It will be further appreciated that while the term "transport trailer" is used throughout this description, the trailer 12 that is described and illustrated in the present application is representative of substantially any form of transport vehicle and portions thereof, including recreational vehicles, pickup trucks, pickup truck slide-in campers, pickup truck bed rails, pickup truck toppers, automobile roof top carriers, and various other motorized and non-motorized vehicles. Further, it will be appreciated that the principles of the present invention may be applied to marine vessels or even non-vehicles such as storage buildings, without departing from the spirit and scope of the present invention.

In the illustrated embodiment of FIGS. 1-7, a pivotably extendable hay pod elevator system 10 is essentially self-contained and integrated into trailer 12. The elevator system 10 is capable of manual or powered deployment and retraction by a single operator or user. The vertical raising and lowering mechanism, in the form of a lift 16, is operable to raise the hay pod 14 along an arcuate travel path proximate the trailer, and over the top of the trailer 12 to stow the hay pod 14 for travel, as sequentially demonstrated in FIGS. 5A-5E, for example. The lift 16 is further operable to move the hay pod 14 out from over the top of the trailer 12 and to lower it down relative to the outside of the trailer 12 to a deployed configuration, as demonstrated in a reverse sequential order of FIGS. 5A-5E, for example. The arcuate travel path extends from an upper portion of the trailer to a lower portion of the trailer proximate a ground surface adjacent the trailer. Hay pod 14 deploys to provide convenient access to stored supplies or materials to a user outside the trailer 12, such as stored food for animals, tools, tack, camping supplies, or substantially any other goods that are desired for storage on a trailer or other vehicle. Thus, the transport trailer with integrated hay pod elevator system 10 greatly simplifies storage of hay or animal feed above a trailer so as to reduce or eliminate much of the manual lifting that is usually associated with temporary care of livestock.

The lift 16 includes two pivot arms 18 pivotably coupled at their respective proximal ends 18b to opposite ends of a central portion of the upright side wall of the trailer 12 (FIGS. 1-5A). The pivot arms 18 define the arcuate travel path that extends from an upper portion of the trailer to the lower portion of the trailer proximate the ground surface. A cross bar or hay pod support bar 20 extends between the distal ends of the pivot arms 18b. The cross bar 20 is coupled to the pivot arms 18 at support sleeves 21 and is rotatable within the sleeves 21 (FIGS. 1-4). The cross bar 20 may support at least a portion of the hay pod(s) 14, although in the deployed position of FIG. 5A the hay pods 14 are shown as spaced above the cross bar 20. The pivot arms 18 are pivotable greater than ninety degrees (90°) to raise and lower the cross bar 20 and hay pod 14 along the arcuate travel path between a deployed configuration proximate the side of the trailer 12 (FIGS. 1 and 5A) and a stowed configuration above the roof of the trailer 12 (FIGS. 2-4 and 5E). The pivot arm 18 is pivotably coupled to the trailer at a lift hinge frame 22 that provides a pivot point 22a for the lift 16.

Figure 4:
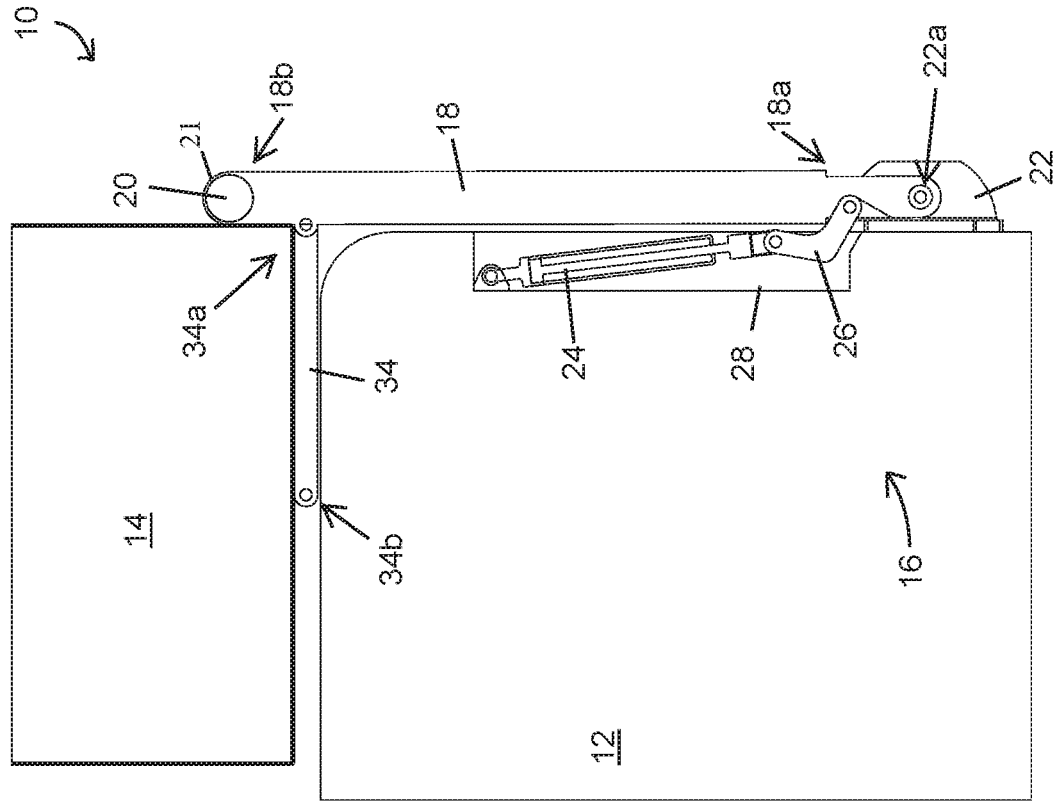
FIG. 4 is a partial sectional view of the transport trailer and deployable hay pod elevator taken at line IV of FIG. 3.
Figure 3:
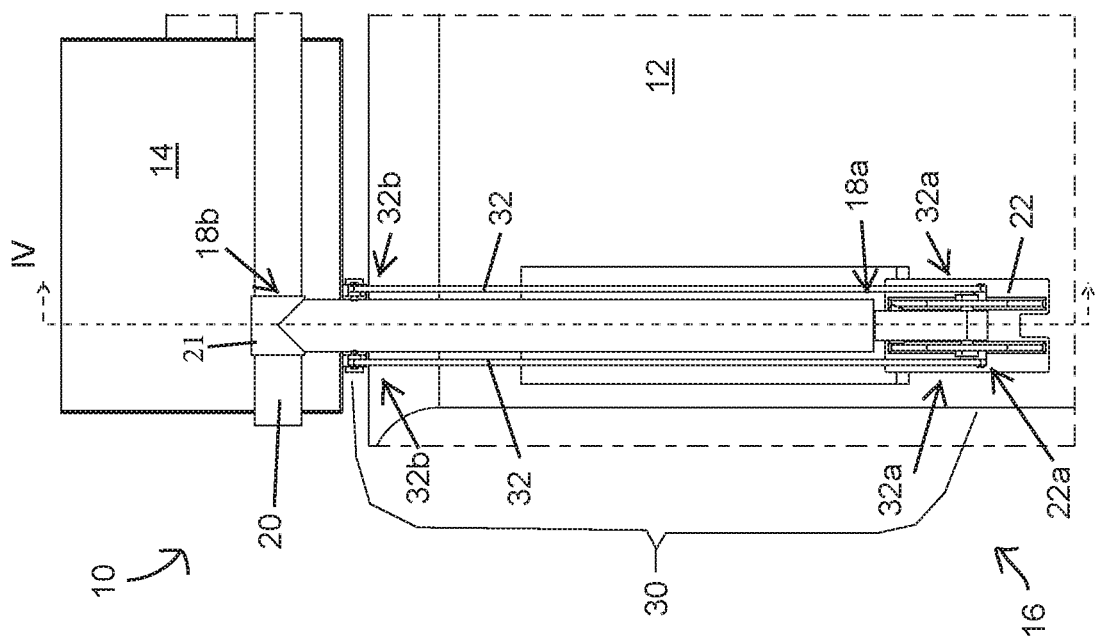
FIG. 3 is a side elevation of portions of the deployable hay pod elevator of FIG. 1.

An actuation assist mechanism 24 is included with the lift 16 to assist a user in deployment and stowage of the hay pod 14. The assist mechanism 24 is coupled at one end to a portion of the side wall of the trailer 12 above the hinge 22, such as to an internal frame of the side wall. The opposite end of the assist mechanism 24 is coupled to one end of a pivot fulcrum 26. The opposite end of the pivot fulcrum 26 is coupled to a portion of the pivot arm 18 that is spaced apart from the pivot point 22a. The assist mechanism 24 and pivot fulcrum 26 coordinate to pivot the lift 16 during stowage and deployment. The assist mechanism 24 may be a gas spring or strut, a gas shock, a hydraulic strut, a linear actuator, or the like. Preferably, the assist mechanism 24 is a powered reciprocating linear biasing element, such as a powered pneumatic or hydraulic cylinder, or an electric linear actuator. The trailer mount portion of the assist mechanism 24 is located inside of a recess 28 disposed in the side wall, however, it will be appreciated that the assist mechanism 24 may be coupled to an exterior surface of the trailer 12. As shown in FIGS. 1 and 4, the recess 28 is a rectangular cuboid defined in the sidewall, however, it will be appreciated that the recess 28 may be formed of various shapes and volumes.

The cross bar 20 may be rotatable relative to the pivot arms 18 about the longitudinal axis of the cross bar 20 and/or the hay pods 14 may be rotatable relative to the cross bar 20 about the longitudinal axis of the cross bar 20 or at a different axis that is parallel to the longitudinal axis of the cross bar 20. Coupling supports 29 are disposed between adjacent hay pods 14 (FIG. 1) to provide stabilization between the hay pods 14 and to synchronize actuation of the hay pods 14 as the elevator system 10 is deployed and stowed. It will be appreciated that the coupling supports 29 may be omitted without substantially affecting the operation of the elevator system 10. The hay pods 14 may be manually or automatically rotatable relative to the pivot arms 18. While the hay pods 14 are depicted as moveable relative to the pivot arms 18 (see sequential steps depicted in FIGS. 5A-5E), it will be appreciated that in some embodiments the hay pods 14 may be fixed relative to the pivot arms 18 such that the orientation of the hay pod 14 relative to the trailer 12 is dependent on the angle of the pivot arm 18 relative to the trailer 12.

Figure 2:
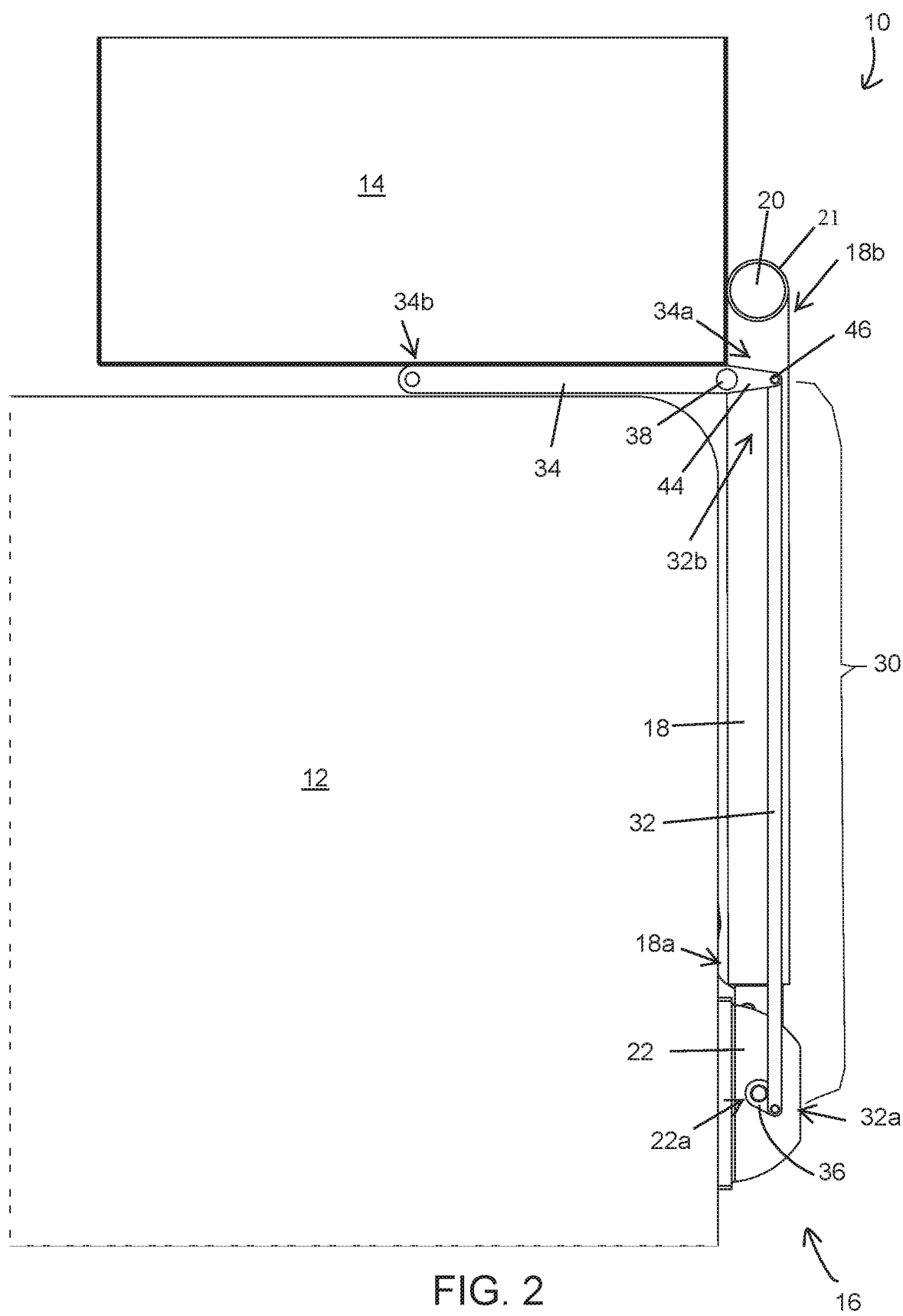
FIG. 2 is a rear elevation of portions of the deployable hay pod elevator and trailer of FIG. 1.

A hay pod actuation mechanism, in the form of a linkage assembly 30, is coupled between each pivot arm 18 to automatically rotate the hay pods 14 relative to the pivot arms 18 (FIGS. 1-3, 5A-7). The linkage assembly 30 includes a pair of linkage rods or bars 32 coupled with each pivot arm 18, a hay pod rotation or pivot actuation bar 34 coupled between one of the hay pods and the linkage rod 32, and an actuation bracket 36 coupled between the lift hinge frame 22 and the linkage rod 32 (FIG. 2). The pivot actuation bar 34 is coupled to the pivot arm 18 at an actuation bar pivot pin 38. The actuation pivot pin 38 is positioned at a distal end 18b of the pivot arm 18 and spaced inboard or proximally relative to the cross bar 20.

Figure 7:
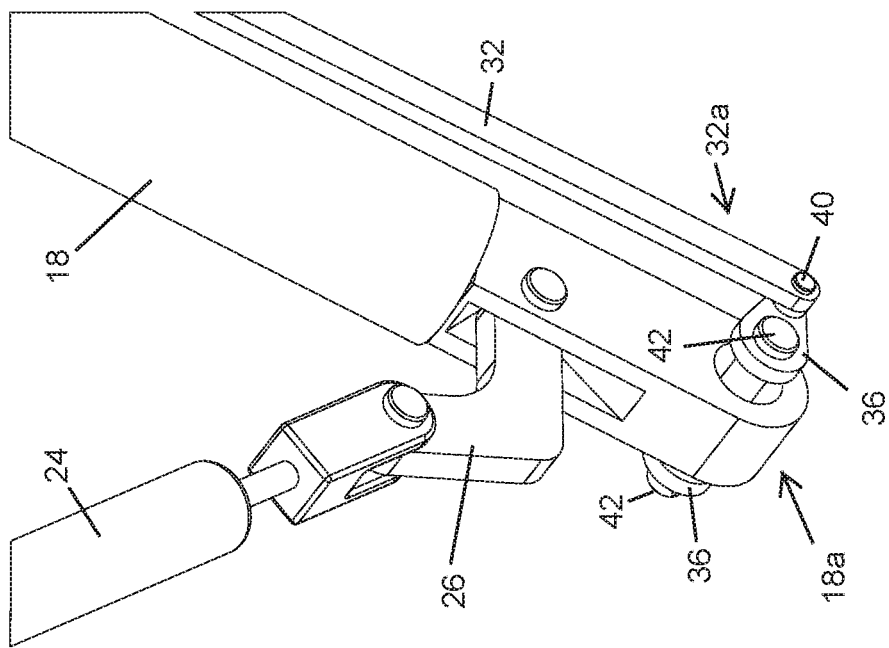
FIG. 7 is another perspective view of the pivot fulcrum and hay pod rotation linkage assembly of FIG. 6, depicted with the hinge frame omitted.
Figure 6:
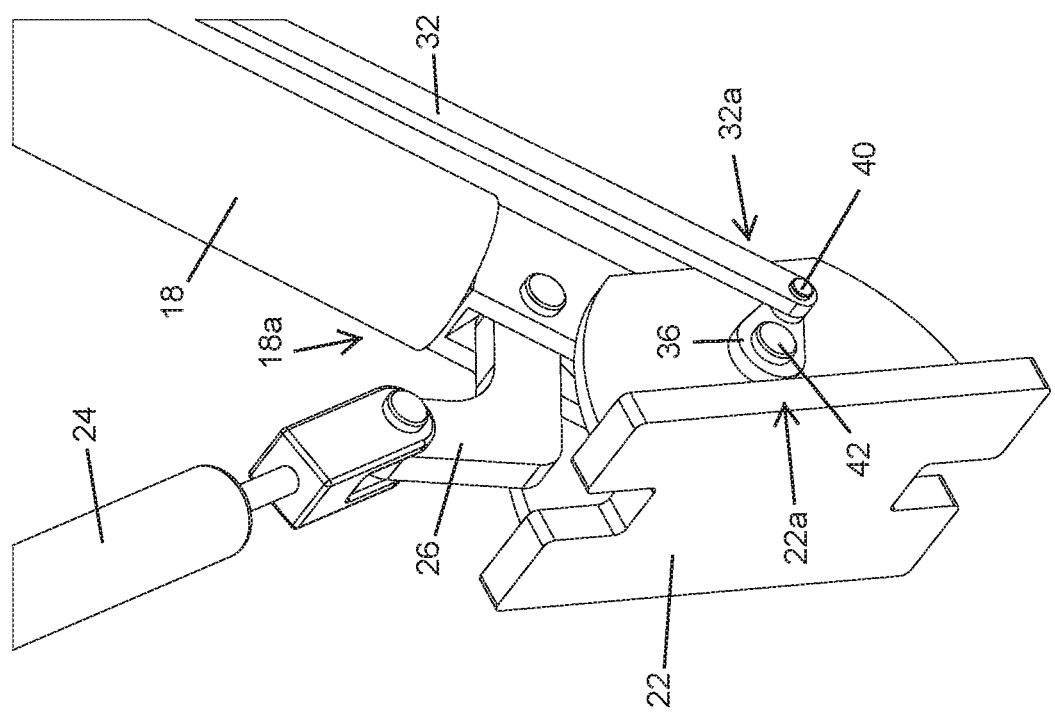
FIG. 6 is a perspective view of a lift hinge frame, a pivot fulcrum, and hay pod rotation linkage assembly of the deployable hay pod of FIG. 1.

The actuation bracket 36 includes an offset linkage pin 40 at which the proximal end of the linkage rod 32 is rotatably coupled (FIGS. 6-7). The actuation bracket 36 is fixed to a bracket mounting pin 42 that is disposed through the hinge 22 at the pivot point 22a. As best shown in FIG. 7, the actuation bracket 36 is rotationally fixed to the hinge frame 22 such that the actuation bracket 36 does not rotate while the lift 16 is being stowed or deployed. The offset linkage pin 40 and the mounting pin 42 are spaced apart from one another at respective ends of the actuation bracket 36. An offset distance and an offset angle are provided and form a triangulating offset that automatically imparts a force on the linkage rod 32 as the lift 16 moves. The offset distance and offset angle are defined by the relative positioning and space between the fixed offset linkage pin 40 and the fixed bracket mounting pin 42. The actuation bracket offset distance, offset angle, and actuation force through the linkage rod 32 will be explained in more detail below.

The linkage rod 32 is pivotably coupled at the distal end 32b to the proximal end 34a of the pivot actuation link 34 (FIGS. 2, 4, 5A-5E). The pivot actuation link 34 is pivotably coupled to the pivot arm 18b at the actuation bar pivot pin 38. The pivot pin 38 is positioned near a proximal end 34a of the actuation link 34 and near a distal end of the pivot arm 18b. A hay pod 14 is fixedly coupled to the distal end 34b of the pivot actuation link 34 such that as the actuation link 34 is actuated, the hay pod 14 is rotated at the pivot pin 38 about an axis parallel to the longitudinal axis of the cross bar 20. As best shown in FIG. 2, a lever arm portion 44 of the actuation link 34 extends linearly beyond the actuation pivot pin 38 opposite the hay pod 14. The distal end of lever arm 44 is pivotably coupled to the distal end 32b of the linkage rod 32 at a linkage pin 46.

When the elevator system 10 is in the fully deployed configuration, the pivot arm 18 is angled laterally outwardly and downwardly toward the ground surface to make the hay pod 14 accessible proximate the ground surface, such that the hay pod 14 is accessible by users or animals on the ground. In this configuration, the angle between the hay pod 14 and the pivot arm 18 is set to ensure that the hay pod 14 is substantially fully upright, or parallel to the side wall of the trailer 12, when the system 10 is in the fully deployed configuration. Linkage assembly 30 provides an automatic angle adjustment between the hay pod 14 and the pivot arm 18 as the system 10 moves between the stowed and deployed configurations. As the system 10 deploys from above the trailer toward the deployed configuration, the angle between the hay pod 14 and the pivot arm 18 is decreased as the distance between the pivot pin 38 and the offset linkage pin 40 decreases, imparting a compressive actuation force to the linkage rod 32. While the linkage rod 32 is experiencing a compression force, the linkage arm 32 pushes the lever arm 44 toward the distal end 18b of the pivot arm 18, which causes the opposite end of the pivot actuation link 34 and the hay pod 14 to pivot about the pivot pin 38 and towards a middle portion the pivot arm 18.

Conversely, as the system 10 stows from the deployed configuration to the stowed configuration, the angle between the hay pod 14 and the pivot arm 18 is increased as the distance between the pivot pin 38 and the offset linkage pin 40 increases, imparting a tensile actuation force to the linkage rod 32. While the linkage rod 32 is experiencing a tension force, the linkage arm 32 pulls the lever arm 44 toward the proximal end 18a of the pivot arm 18a, which causes the opposite end of the pivot actuation link 34 and the hay pod 14 to pivot away from the pivot arm 18 about the actuation pivot pin 38. The length of the lever arm 44 and the offset distance and offset angle between the offset linkage pin 40 and the bracket mounting pin 42 are chosen as a function of the desired rotation of the hay pod 14 relative to the pivot arm 18 about the rotational axis of the pivot pin 38.

Thus, as the system 10 is maneuvered between the stowed and deployed configurations, the actuating force imparted on the linkage rod 32 due to the offset distance and angle of the actuation bracket 36 is transferred from the linkage rod 32 to the pivot actuation link 34 via the lever arm 44 and actuation pivot pin 38. The actuating force on the pivot actuation link 34 causes the hay pod 14 to pivot relative to the pivot arm 18 about the actuation pivot pin 38. The linkage assembly 30 and pivot arms 18 coordinate to rotate the hay pods 14 relative to the actuation pivot pin 38 between a horizontal or flat orientation when in the stowed configuration (FIGS. 2-4) to a vertical or upright orientation when in the deployed configuration (FIGS. 1 and 5A). In FIGS. 5A-5E, five different hay pod positions are illustrated depicting the hay pod 14 being stowed from the deployed configuration to the stowed configuration. It will be appreciated that one of the linkage rods 32 of linkage assembly 30 may be omitted and that only a single linkage rod 32 coupled with each pivot arm 18 may be sufficient to rotate the hay pods 14 relative to the pivot arms 16 and cross bar 20.

Figure 8:
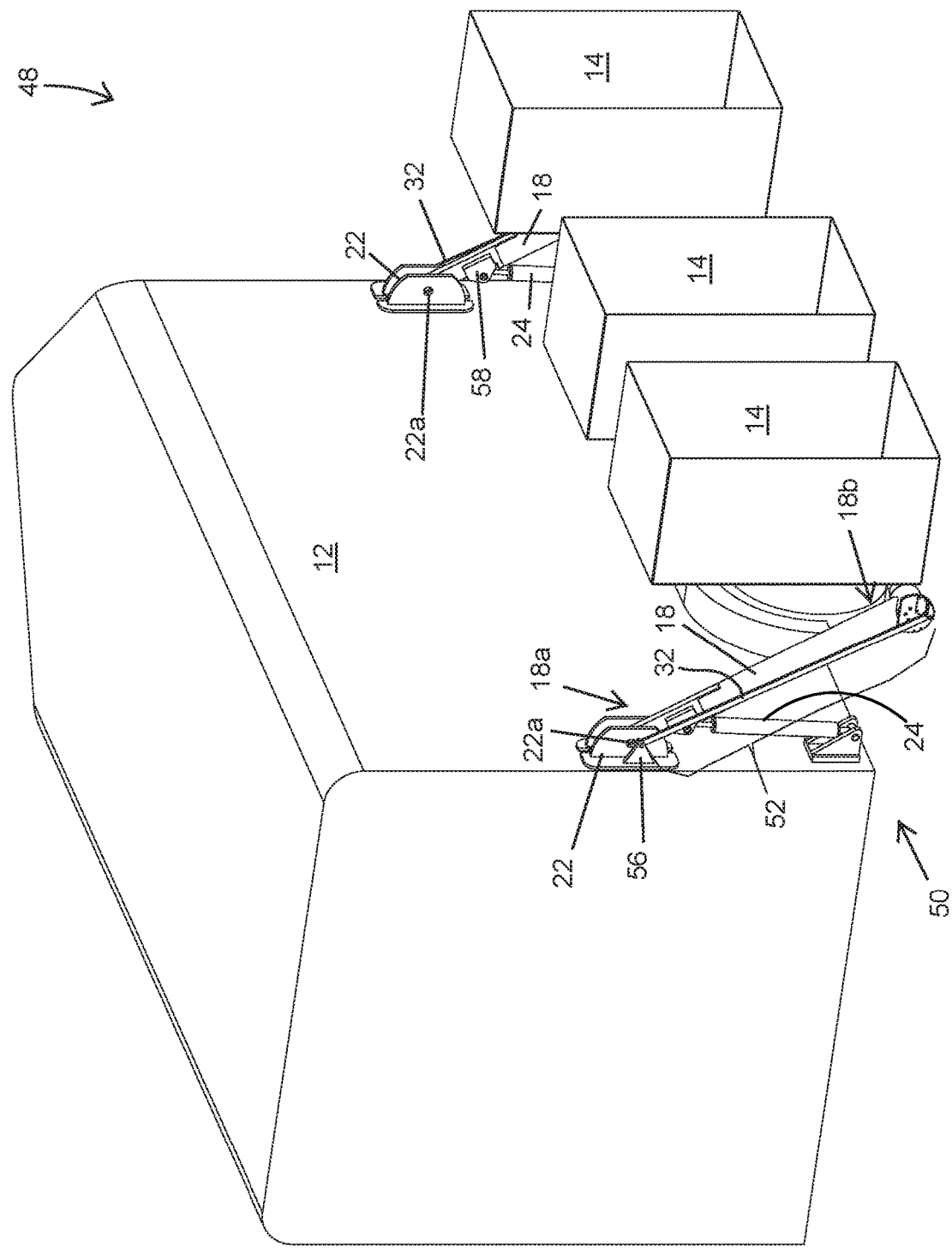
FIG. 8 is a rear-side perspective view of another deployable hay pod elevator coupled to a trailer in accordance with the present invention, depicted with the hay pod elevator in a deployed configuration.
Figure 9A:
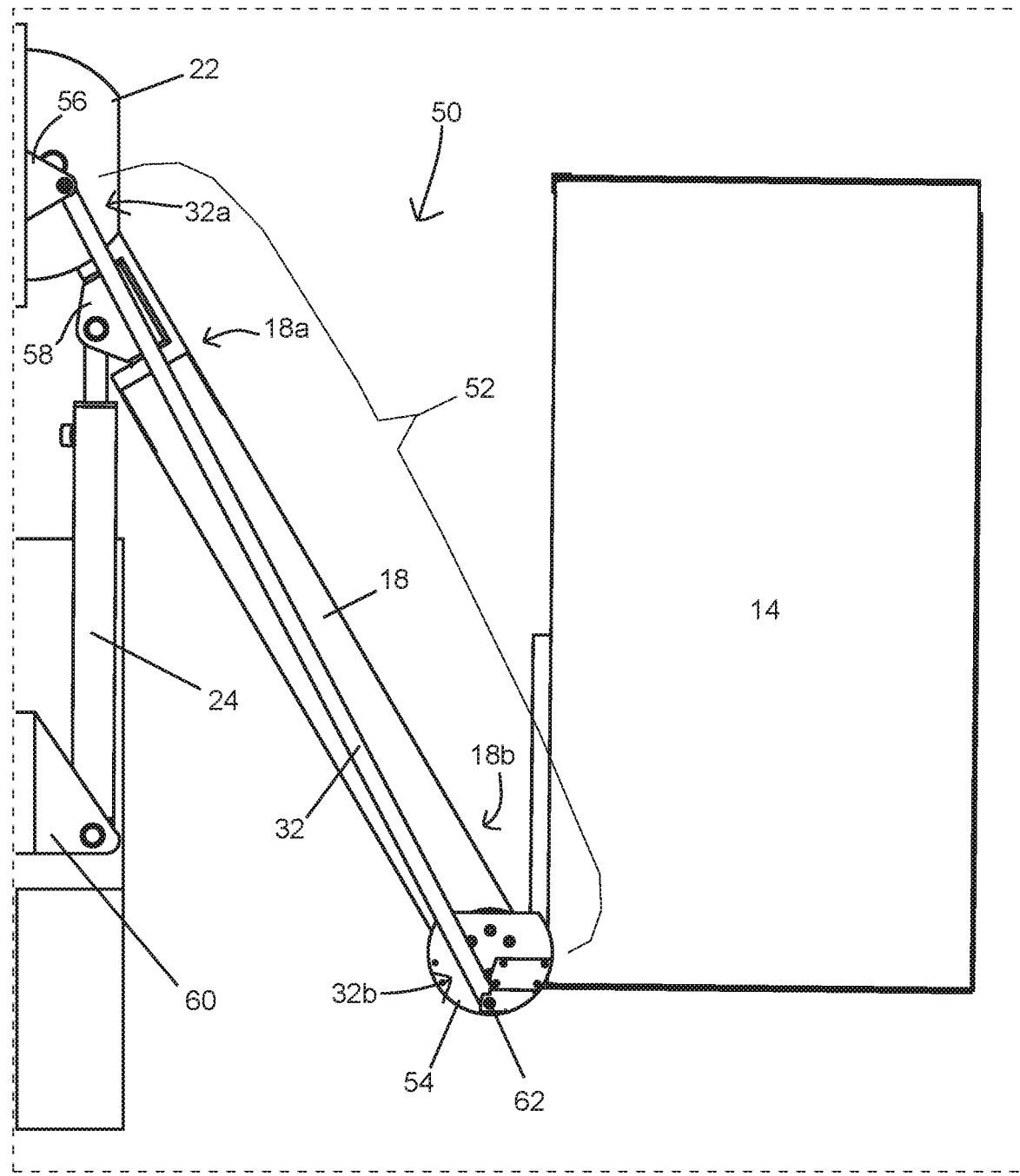
FIG. 9A is an enlarged view of the region designated 9A in FIG. 9.
Figure 10A:
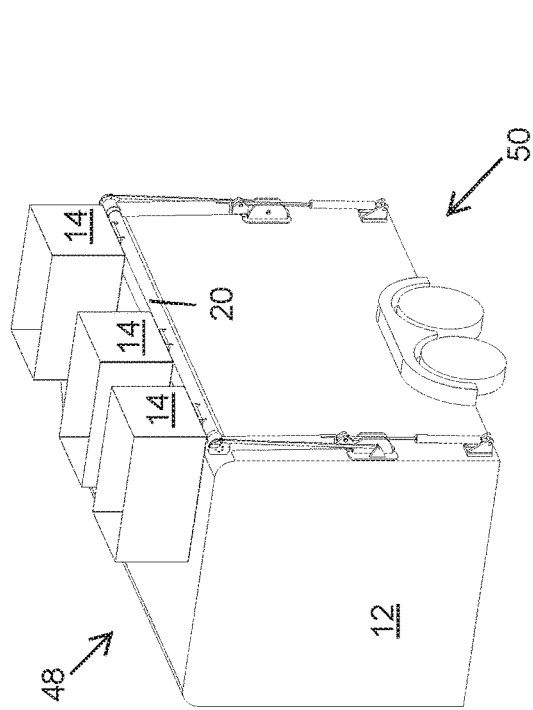
FIGS. 10A-10D are rear-side perspective views of the deployable hay pod elevator and trailer of FIG. 8, depicting sequential steps of deploying the deployable hay pod.
Figure 10B:
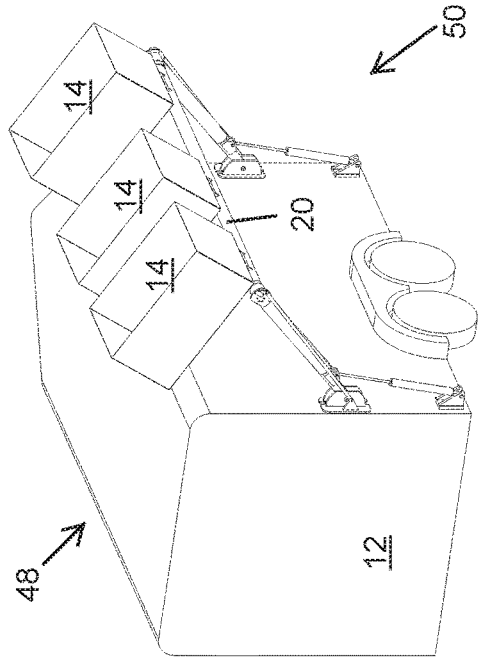
Figure 10C:
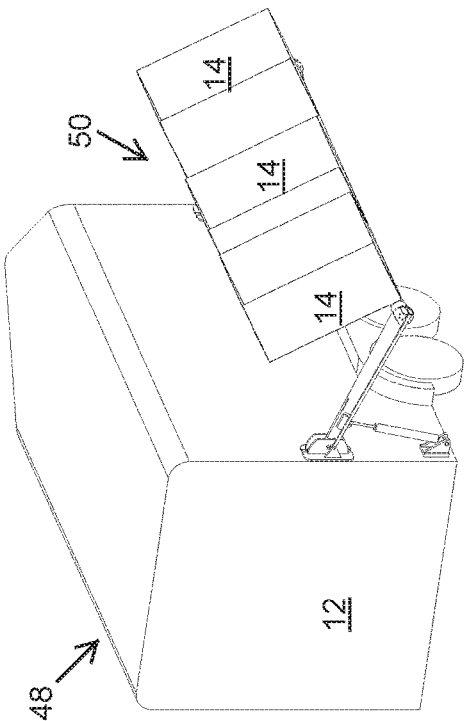
Figure 10D:
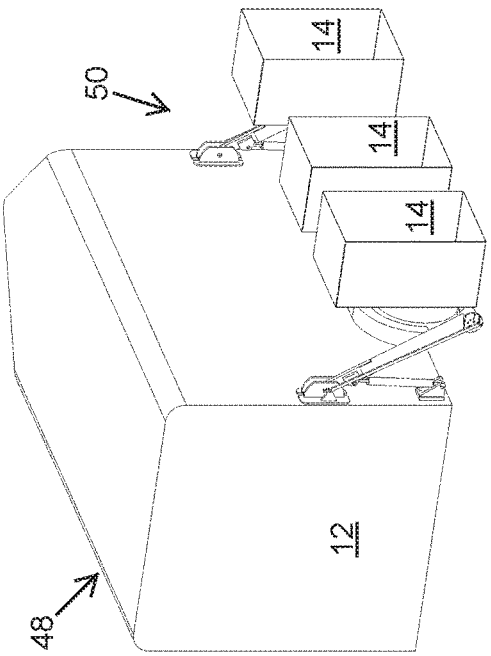

Referring to the illustrative embodiments of FIGS. 8-10D, an integrated storage bin or hay pod elevator system 48 is provided for a transport trailer 12. The elevator system 48 functions in similar fashion to system 10 described above, and includes many identical or substantially similar components, with significant differences discussed hereinafter. The elevator system 48 includes a vertical raising and lowering mechanism, in the form or a hoist or lift 50, having two pivot arms 18, a rotatable cross bar or hay pod support bar 20, a hinge frame 22, and an actuation assist mechanism 24 that are substantially identical to their corresponding components of lift 16 of system 10 described above. The actuation assist mechanism 24 of lift 50 is positioned below the hinge frame 22, as opposed to above the hinge frame as positioned for lift 16. Lift 50 includes a hay pod actuation mechanism in the form of a linkage assembly 52, which includes a linkage rod 32 similar to the linkage rod of lift 16, a cross bar actuation bracket 54, and a trailer linkage mount frame 56 (FIGS. 8-9A). Lift 50 includes a pivot fulcrum 58 coupled to the pivot arm 18 proximate the proximal end 18a of the pivot arm. The pivot fulcrum 58 is sufficiently spaced apart from the hinge frame pivot point 22a to ensure proper clearance between the hinge 22 and the actuation assist mechanism 24 during stowage and deployment of the system 48.

The actuation assist mechanism 24 is pivotably coupled at one end to the pivot fulcrum 58 and pivotably coupled at the opposite end to a trailer mount frame 60 that is disposed proximate the bottom of the side wall of the trailer 12 (FIG. 8-9A). The proximal end 32a of the linkage rod 32 is pivotably coupled to the trailer linkage mount 56 and the distal end 32b of the linkage rod 32 is pivotably coupled to a bracket actuation pin 62 disposed on a portion of the actuation bracket 54. The actuation bracket 54 is fixedly coupled to an end portion of the rotatable cross bar 20. The actuation pin 62 is offset from the longitudinal center of the cross bar 20 such that as the linkage rod 32 transfers a force to the pin 62, the pin 62 transfers the force to the actuation bracket 54 causing the actuation bracket 54 to rotate, which rotates the cross bar 20 relative to the pivot arms 18. At least one hay pod 14 is fixedly mounted to the cross bar 20 such that as the cross bar 20 rotates the hay pod 14 also rotates.

In similar fashion to the offsets described for the actuation bracket 36 of lift 16 of system 10 described above, an offset distance and offset angle are provided between the trailer linkage mount 56 and the pivot point of the hinge 22 to automatically impart an actuating force to the linkage rod 32 while the system 48 is being deployed or stowed. As lift 50 moves (as sequentially illustrated in FIGS. 10A-10D), the offset distance and angle between mount 56 and hinge 22 cause the distance between the trailer linkage mount 56 and the longitudinal center of the cross bar 20 to change. The change in distance between the trailer linkage mount 56 and the center of the cross bar 20 is responsible for imparting the automatic actuating force through the linkage rod. The actuating force caused by the movement of the lift 50 is transferred through the linkage rod 32 to the actuation bracket 54 which causes the cross bar 20 to rotate about its rotational center relative to the pivot arm 18, thereby rotating or changing the orientation of the hay pod 14 relative to the pivot arm 18 as well as the trailer 12, as illustrated in FIGS. 5A-5E.

As the system 48 deploys from above the trailer toward the deployed configuration, the angle between the hay pod 14 and the pivot arm 18 is decreased as the distance between the longitudinal center of the cross bar 20 and the trailer linkage mount 56 decreases, thereby imparting a compressive actuation force to the linkage rod 32. While the linkage rod 32 is experiencing a compression force, the linkage arm 32 pushes the actuation pin 62 toward the distal end of the pivot arm 18b, which causes the actuation bracket 54 and cross bar 20 to rotate such that the hay pod 14 pivots towards the pivot arm 18 about the longitudinal axis of the cross bar 20. Conversely, as the system 48 stows from the deployed configuration to the stowed configuration, the angle between the hay pod 14 and the pivot arm 18 is increased as the distance between the longitudinal center of the cross bar 20 and the trailer linkage mount 56 increases, thereby imparting a tensile actuation force to the linkage rod 32. While the linkage rod 32 is experiencing a tension force, the linkage arm 32 pulls the actuation pin 62 toward the proximal end of the pivot arm 18a, which causes the actuation bracket 54 and cross bar 20 to rotate such that the hay pod 14 pivots away from the pivot arm 18 about the longitudinal axis of the cross bar 20.

Figure 11A:
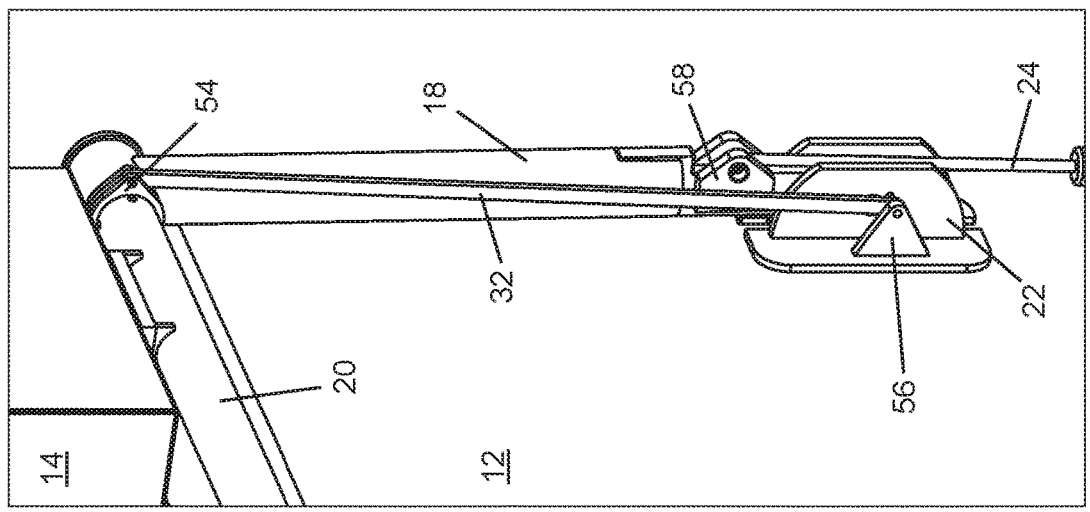
FIG. 11A is an enlarged view of the region designated 11A in FIG. 11.
Figure 11:
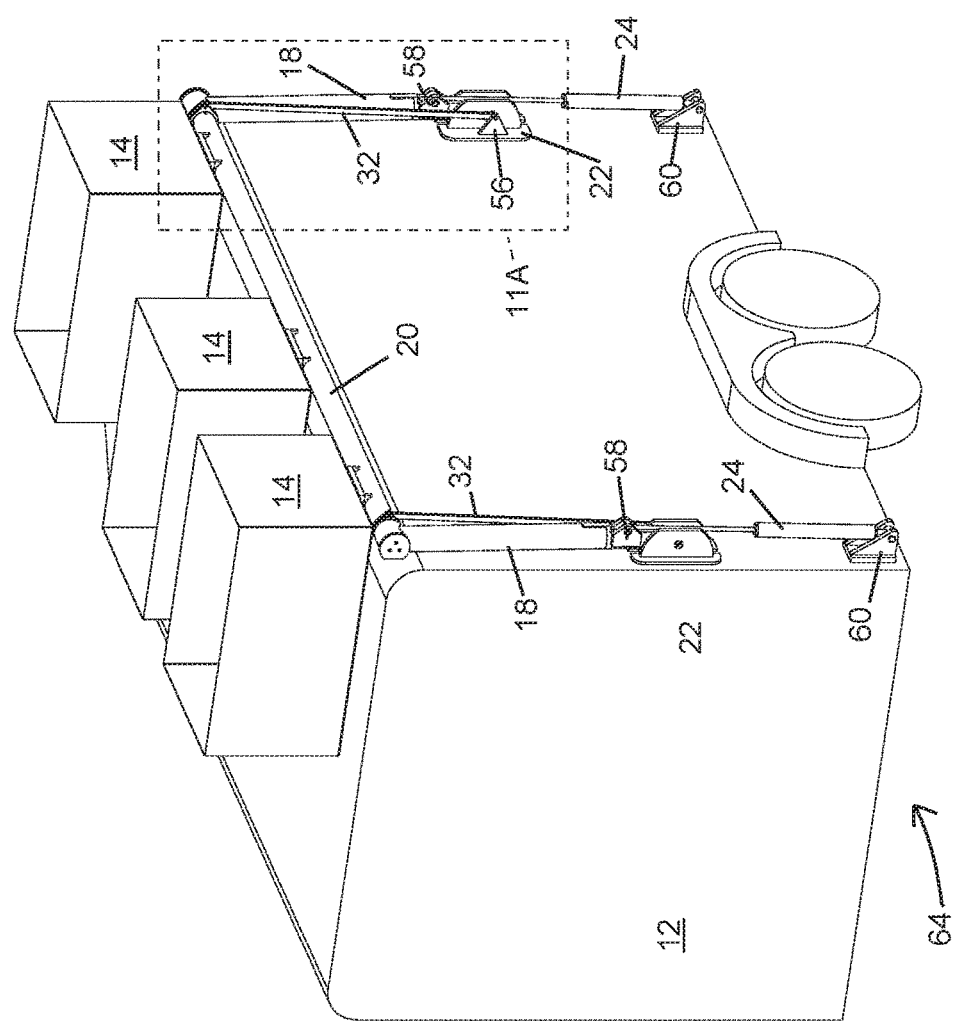
FIG. 11 is a rear-side perspective view of another deployable hay pod elevator in accordance with the present invention, shown coupled to a trailer and in a stowed configuration.
Figure 12A:
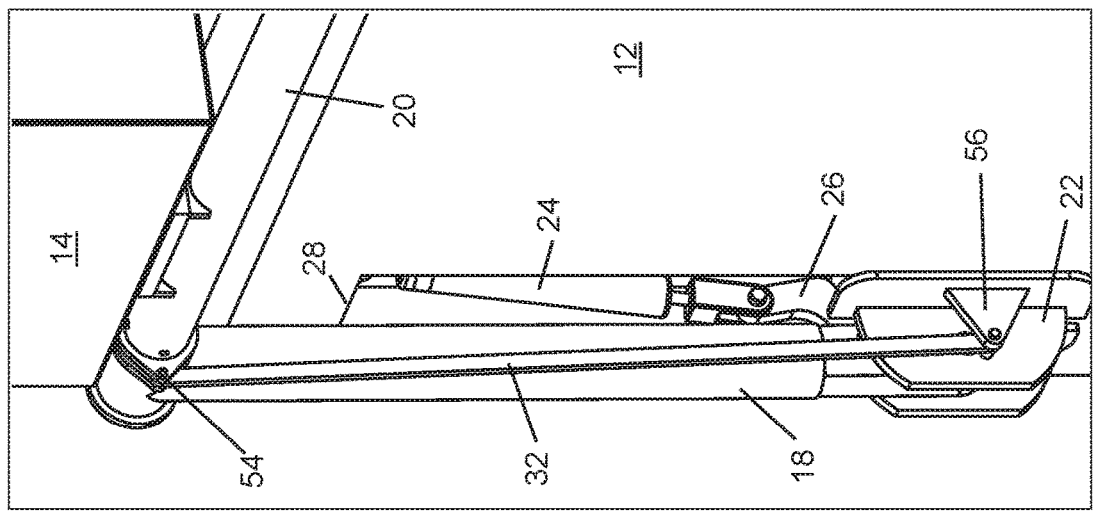
FIG. 12A is an enlarged view of the region designated 12A in FIG. 12.
Figure 12:
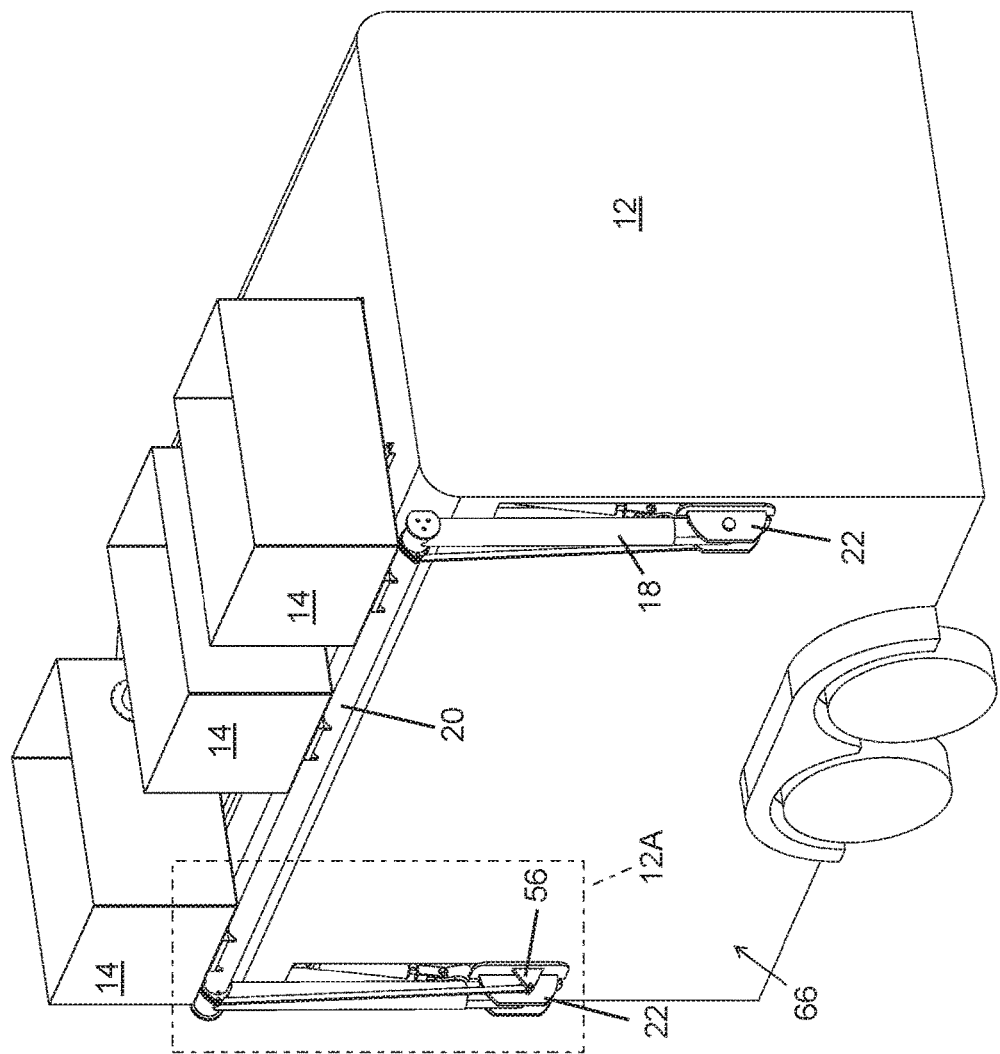
FIG. 12 is a rear-side perspective view of another deployable hay pod elevator in accordance with the present invention, shown coupled to a transport trailer and in a stowed configuration.
Figure 13A:
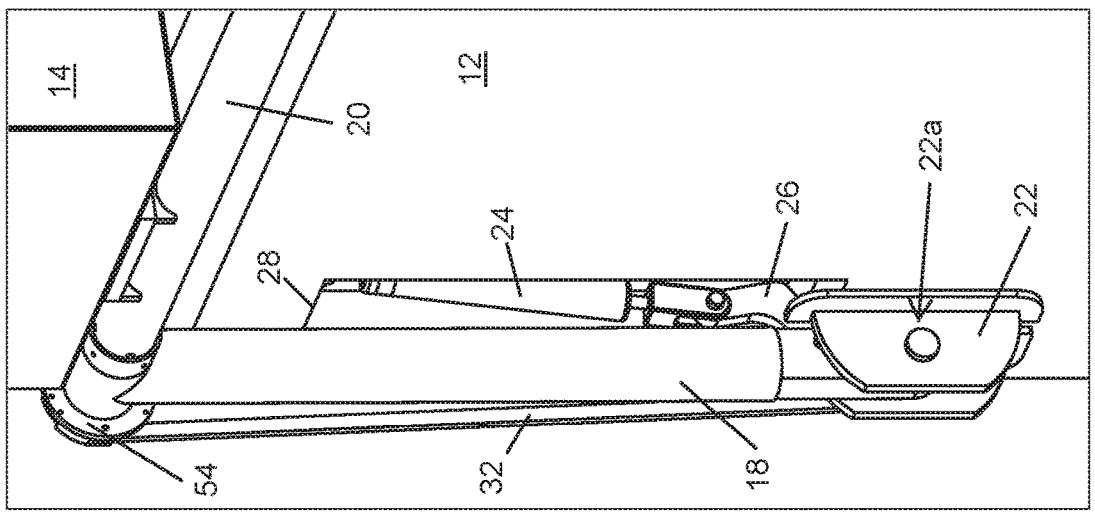
FIG. 13A is an enlarged view of the region designated 13A in FIG. 13.
Figure 13:
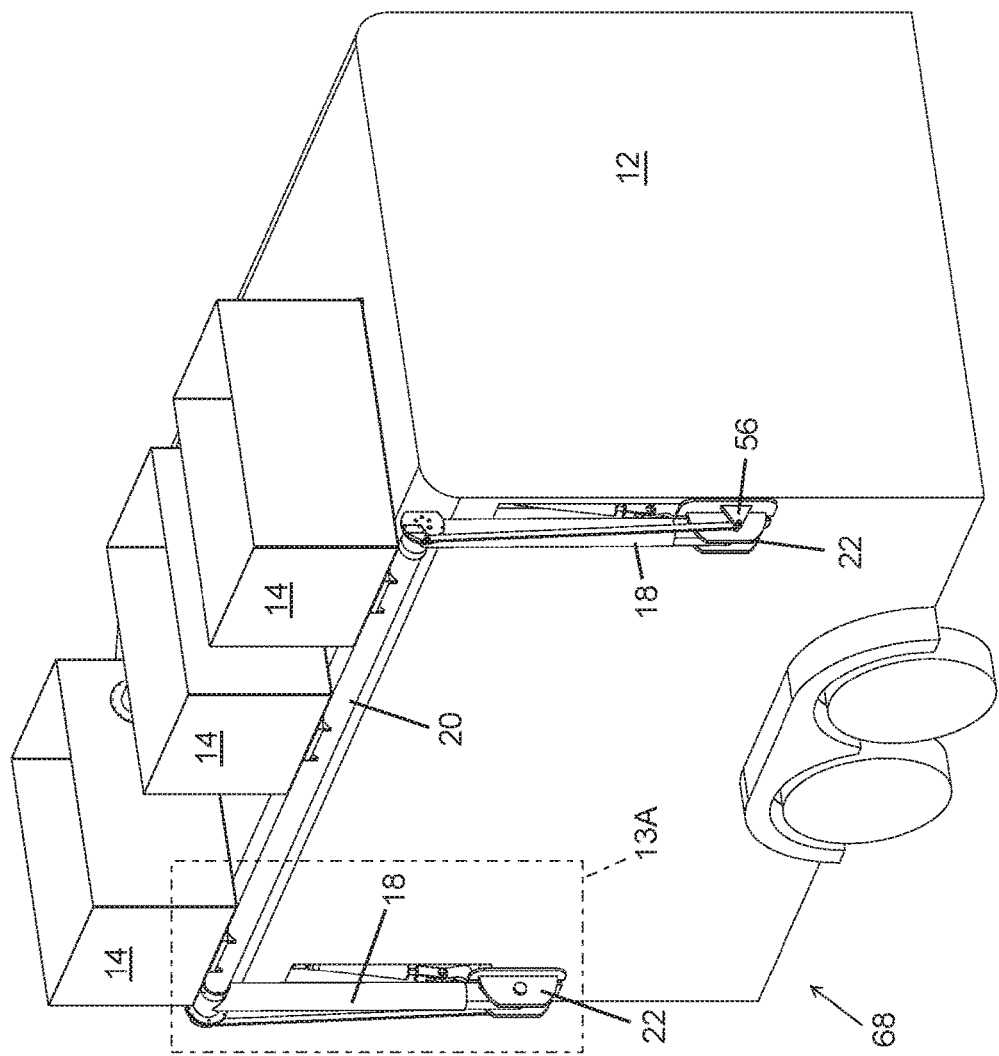
FIG. 13 is a rear-side perspective view of another deployable hay pod elevator in accordance with the present invention, shown coupled to a transport trailer and in a stowed configuration.

Additional embodiments and configurations of hoist or lifts having linkage assemblies and functioning in similar fashion to the lift 16 of system 10 and the lift 50 of system 48 are contemplated. Several of such embodiments are described below in reference to their respective similarities with lifts 16 and 50. A linkage type lift 64 is shown in FIGS. 11 and 11A. The lift 64 includes an actuation assist mechanism 24 disposed below the hinge 22 similar to that of lift 50 of the embodiment illustrated in FIGS. 8-10D. Each linkage assembly of lift 64 includes one linkage rod 32 coupled with the corresponding pivot arm 18 with the linkage rod 32 positioned on the inboard side of the pivot arm 18. The linkage assemblies of lift 64 include cross bar actuation brackets 54 similar to that of lift 50, with the brackets 54 mounted inboard of the respective pivot arms. Another linkage type lift 66 is shown in FIGS. 12 and 12A. The lift 66 includes an actuation assist mechanism 24 disposed above the hinge 22 similar to that of lift 16 of the embodiment illustrated in FIGS. 1-7. Each linkage assembly of lift 66 includes one linkage rod 32 coupled with the corresponding pivot arm 18 with the linkage rod 32 positioned on the inboard side of the pivot arm 18. The linkage assemblies of lift 66 include cross bar actuation brackets 54 similar to that of lift 50 of the embodiment illustrated in FIGS. 8-10D, with the brackets 54 mounted inboard of the respective pivot arms. The linkage assemblies of lift 66 include a pivot fulcrum 26 similar to that of lift 16 of the embodiment illustrated in FIGS. 1-7. Another linkage type lift 68 is shown in FIGS. 13 and 13A. The lift 68 is substantially similar to lift 66 of the embodiment illustrated in FIGS. 12 and 12A with differences including that on the lift 68 the linkage rods 32 for each pivot arm are positioned on the outboard side of the respective pivot arm 18 and the brackets 54 are mounted outboard of the respective pivot arms.

Referring now to the illustrative embodiments of FIG. 14-20, an integrated storage bin or hay pod elevator system 70 is provided for a transport trailer 12. The elevator system 70 includes a vertical raising and lowering mechanism, in the form of a hoist or lift 72 and a chain driven hay pod actuation mechanism or assembly 74. In some ways the system 70 functions similarly to systems 10 and 48 described above. Elevator system 70 differs primarily from systems 10 and 48 in that with elevator system 70 the rotation of the hay pods 14 is actuated by the chain driven assembly 74, as opposed to a linkage assembly (see FIGS. 18-20). The elevator system 70 includes two pivot arms 18, a rotatable cross bar or hay pod support bar 20, a hinge frame 22, an actuation assist mechanism 24, and a trailer mount frame 60 that are substantially identical to their corresponding components of lifts 16 and 50 described above. The actuation assist mechanism 24 is pivotably coupled at one end to a pivot pin 76 that is positioned proximate a proximal end 18a of each pivot arm 18. The pivot pin 76 is sufficiently spaced apart from the hinge frame pivot point 22a to ensure proper clearance between the hinge 22 and the actuation assist mechanism 24 during stowage and deployment of the system 70.

Figure 14:
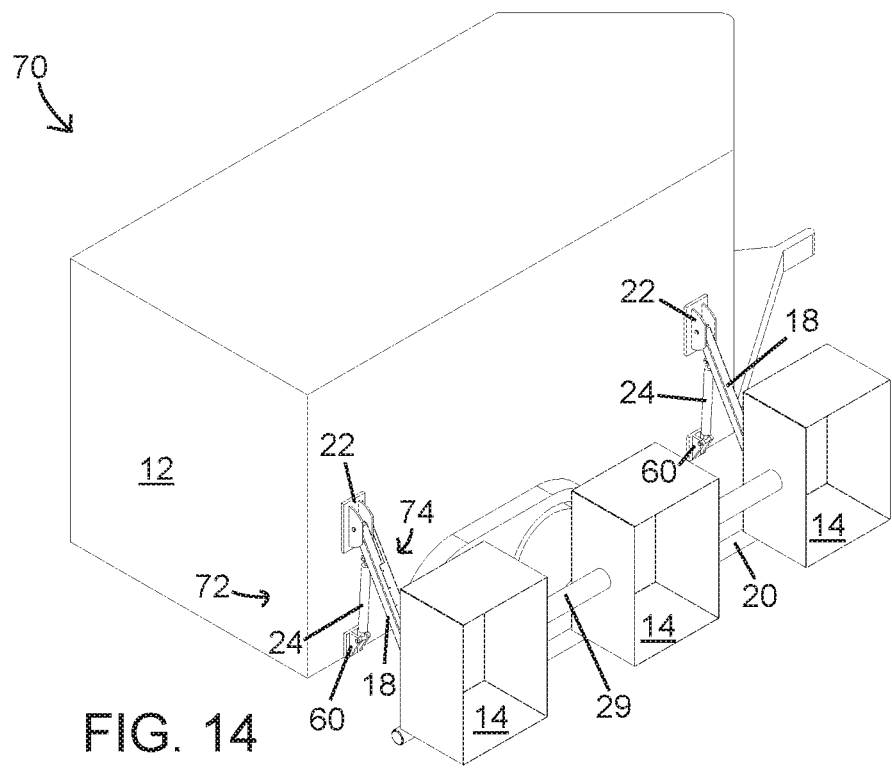
FIG. 14 is a rear-side perspective view of a chain driven deployable hay pod elevator in accordance with the present invention, shown coupled to a transport trailer and with the hay pods in a deployed configuration.
Figure 15:
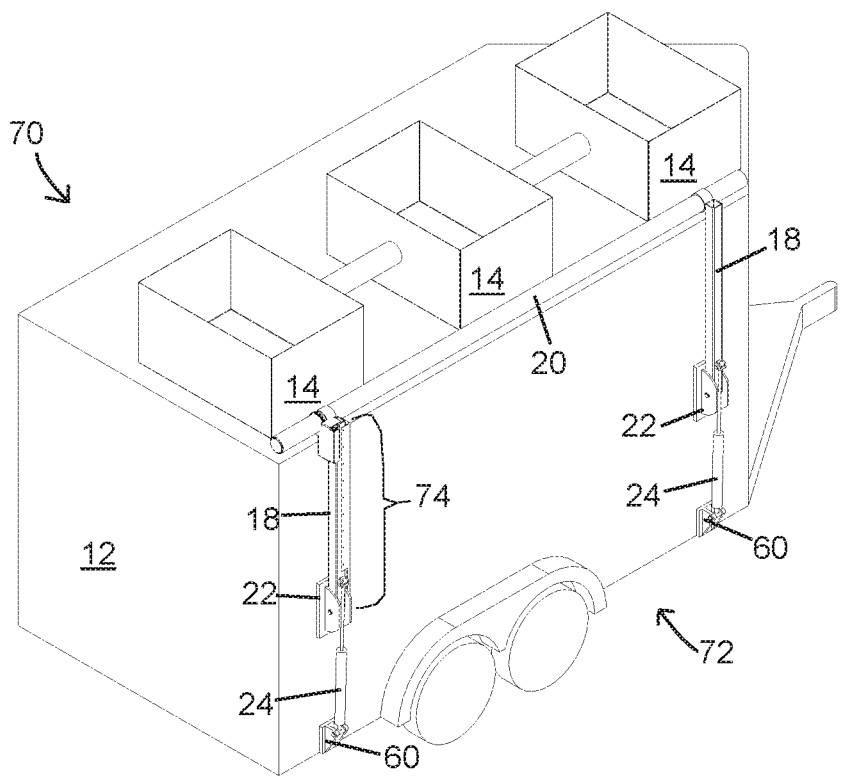
FIG. 15 is another rear-side perspective view of the chain driven deployable hay pod elevator and trailer of FIG. 14, depicted with the hay pods in a stowed configuration.
Figure 17:
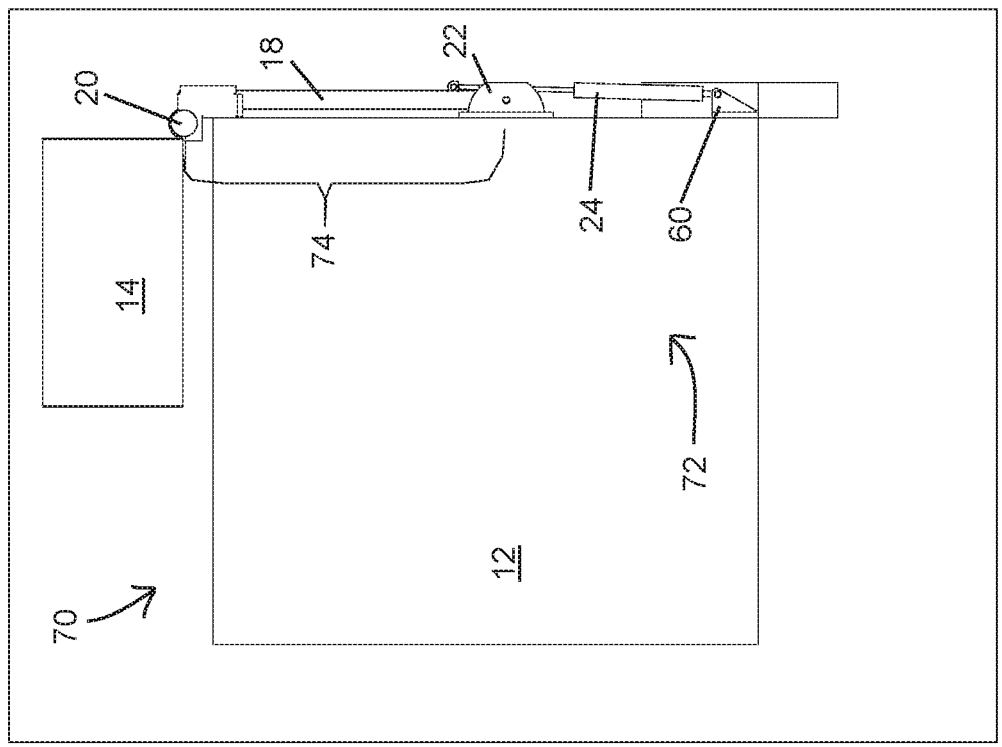
FIG. 17 is a rear elevation of the chain driven deployable hay pod elevator and trailer of FIG. 15.
Figure 16:
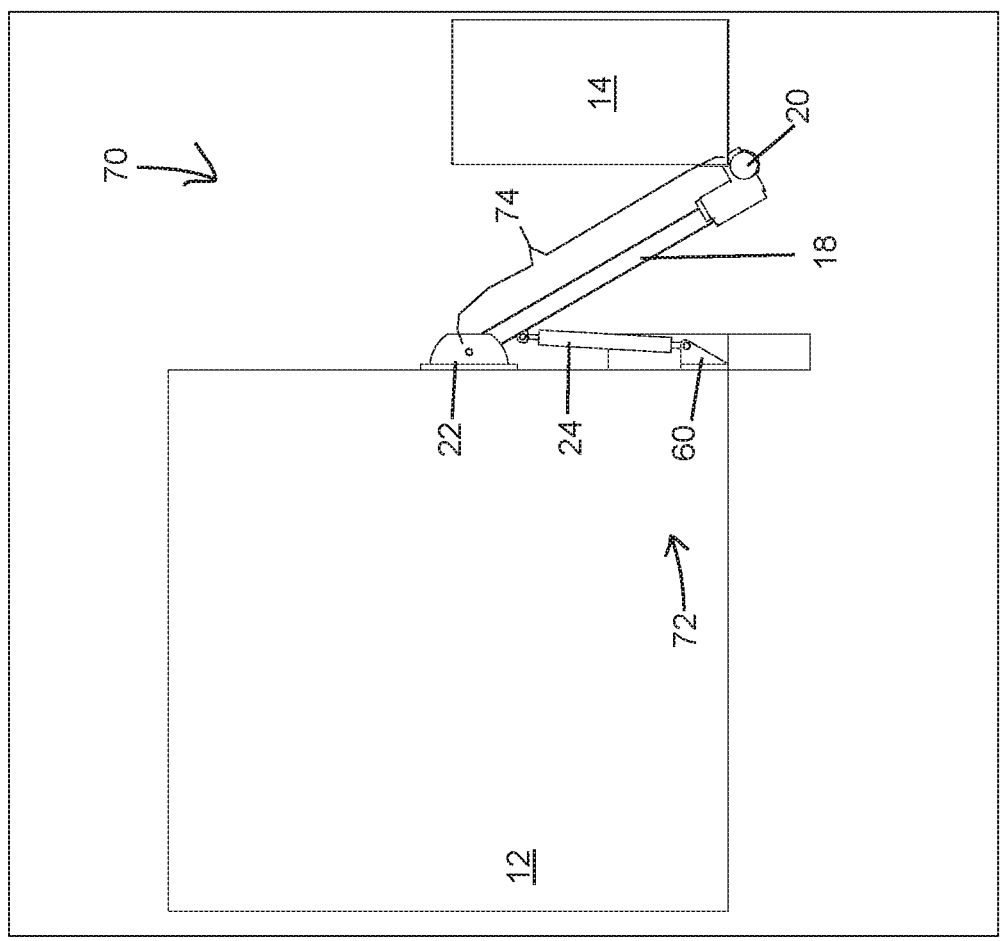
FIG. 16 is a rear elevation of the chain driven deployable hay pod elevator and trailer of FIG. 14.
Figure 20:
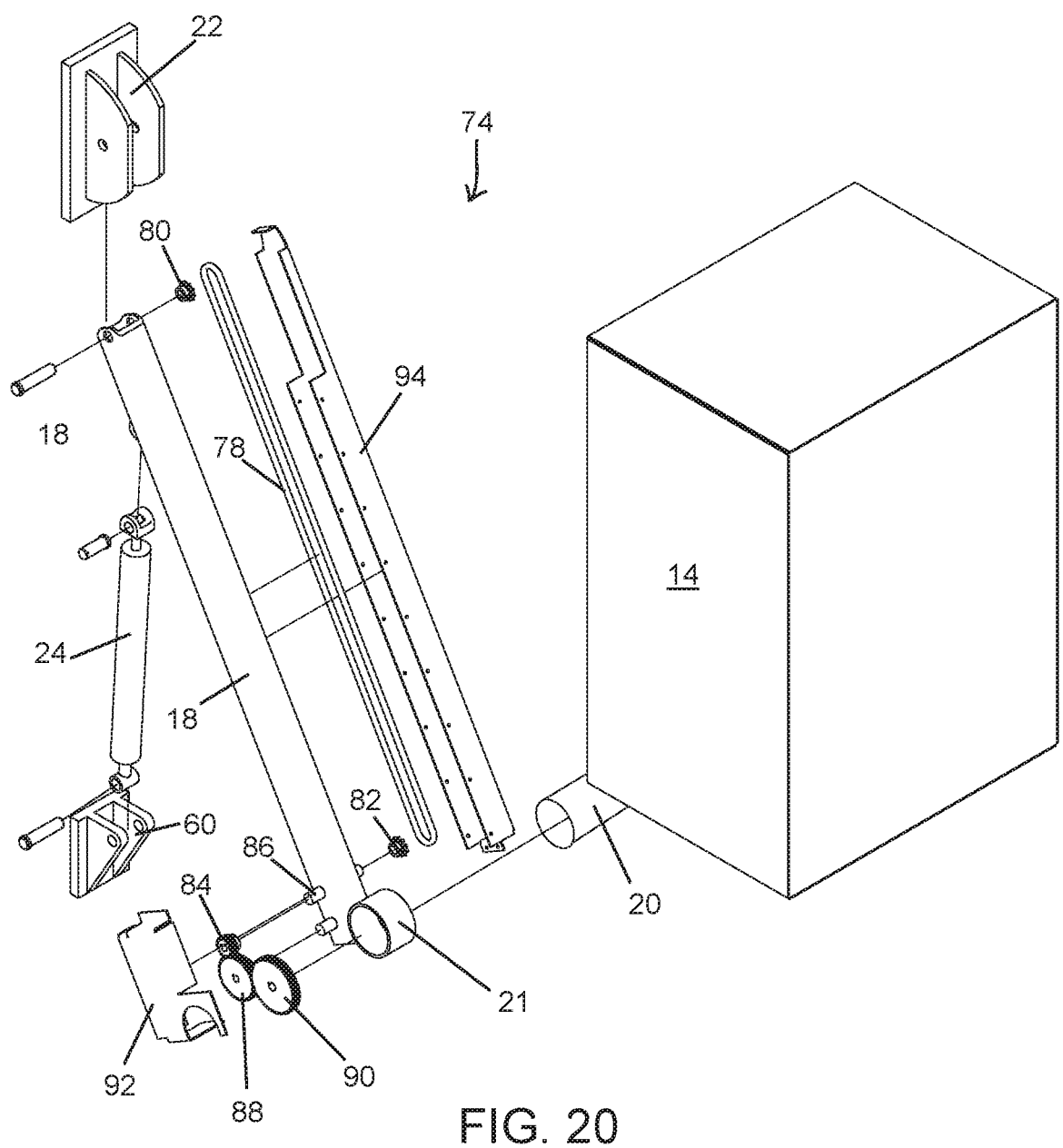
FIG. 20 is an exploded perspective view of the chain driven deployable hay pod elevator of FIG. 14.

The chain driven hay pod actuation assembly 74 is coupled to at least one of the pivot arms 18 of the system 70 (FIGS. 14 and 15). The actuation assembly 74 is operable to rotate the hay pod 14 about the longitudinal axis of the support bar 20 as the system 70 is actuated between stowed and deployed configurations. The support bar 20 is rotatably coupled to the pivot arms 18 at support sleeves 21 (FIG. 20). The actuation assembly 74 and rotatable support bar 20 coordinate to rotate the hay pods 14 relative to the pivot arms 18 between a horizontal or flat orientation when in the stowed configuration (FIG. 15) to a vertical or upright orientation when in the deployed configuration (FIG. 14). Each hay pod 14 is fixed to the rotatable support bar 20 and optionally, supports or bars 29 are disposed between hay pods 14 to form a unitary assembly of the hay pods to further support the hay pods 14 (FIGS. 14 and 15).

Figure 18:
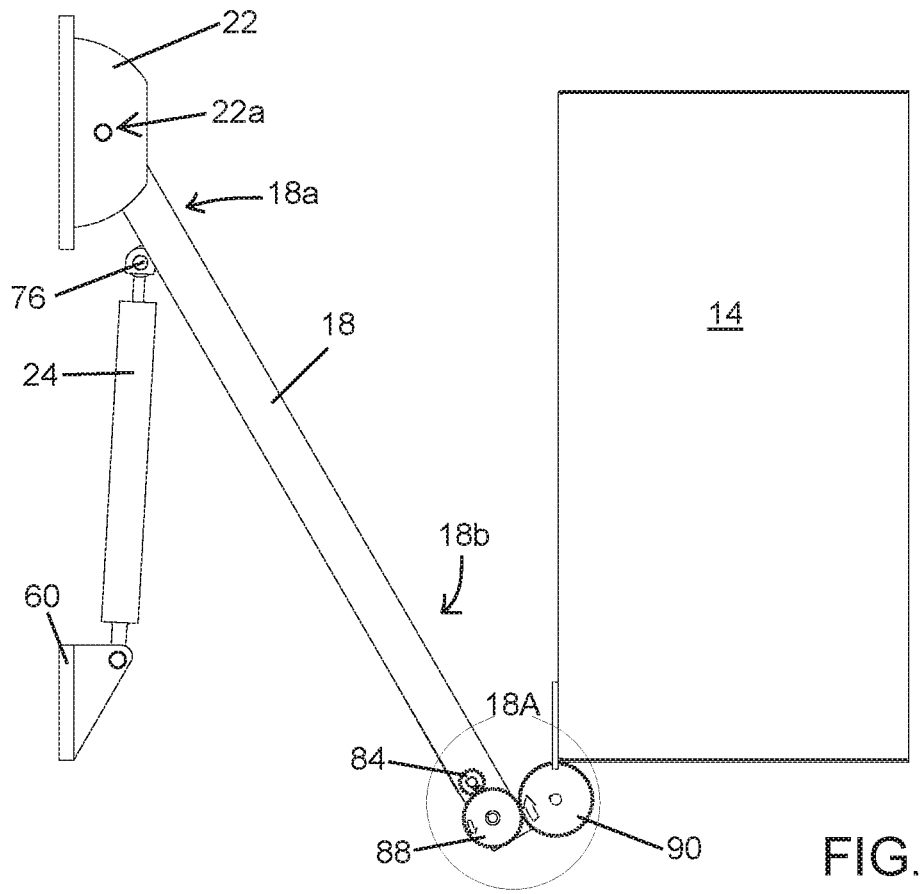
FIG. 18 is an enlarged rear elevation view of the chain driven deployable hay pod elevator of FIG. 14.
Figure 18A:
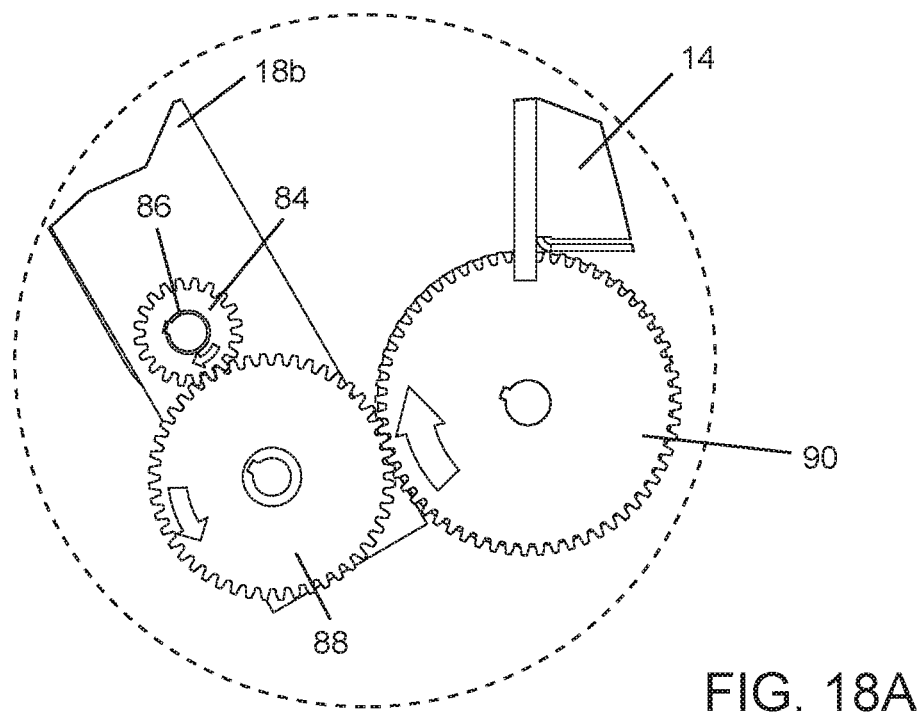
FIG. 18A is an enlarged view of the region designated 18A in FIG. 18.
Figure 19:
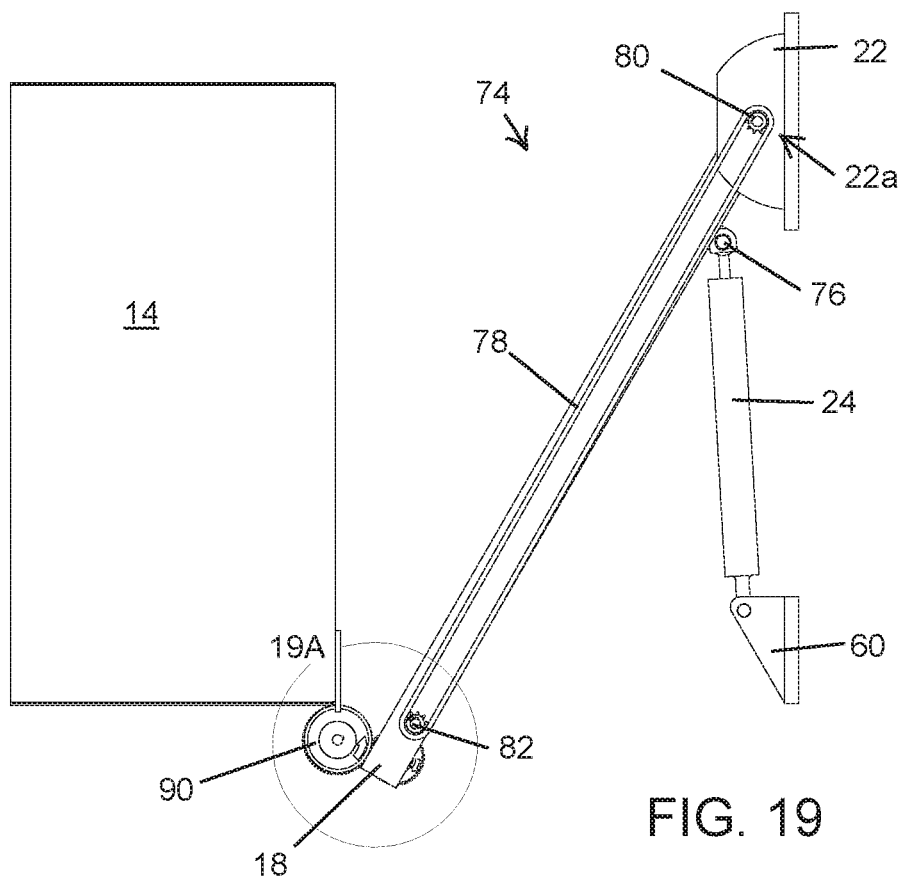
FIG. 19 is an enlarged front elevation of the chain driven deployable hay pod elevator of FIG. 14.

Referring to FIGS. 18-20, each actuation assembly 74 includes a chain 78 routed around a fixed first sprocket 80 and a rotatable second sprocket 82, a rotatable first spur gear 84, a rotatable jack shaft 86 fixedly coupled between the second sprocket 82 and the first spur gear 84 and disposed through a distal end portion 18b of the pivot arm 18. A rotatable second spur gear 88 is rotatably engaged with the first spur gear 84, and a fixed third spur gear 90 is fixedly coupled to the hay pod support bar 20 and rotatably engaged with the second spur gear 88. Optionally, and as shown in FIG. 20, a gear safety cover 92 is provided to cover the spur gears, and a chain safety cover 94 is provided to cover the chain and sprockets. The fixed first sprocket 80 is fixedly coupled to a portion of the hinge frame 22 such that as the lift 72 moves, the chain is actuated due to the movement of the pivot arm 18 relative to the hinge frame pivot point 22a. The second sprocket 82, first spur gear 84, and jack shaft 86 are rotatably coupled to a portion of the distal end 18b of the pivot arm 18. The jack shaft 86 is disposed through the pivot arm 18 with each end at least partially exposed beyond the pivot arm 18 body. The jack shaft 86 is freely rotatable about its longitudinal axis through the pivot arm 18 body, and thus the second sprocket 82 and first spur gear 84, being fixed to opposite ends of the jack shaft 86, rotate along with the jack shaft 86 about its longitudinal axis. The second spur gear 88 is rotatably coupled to a distal portion of the pivot arm 18b in geared engagement with the first spur gear 84. The first spur gear 84 and second spur gear 88 are positioned such that the second spur gear 88 is in geared engagement with the third spur gear 90, which is fixed to a portion of the rotatable hay pod support bar 20. The sprocket sizes, chain length, and spur gear sizes are chosen as a function of the desired rotation of the hay pod 14 relative to the pivot arm 18 about the rotational axis of the hay pod support bar 20.

Figure 19A:
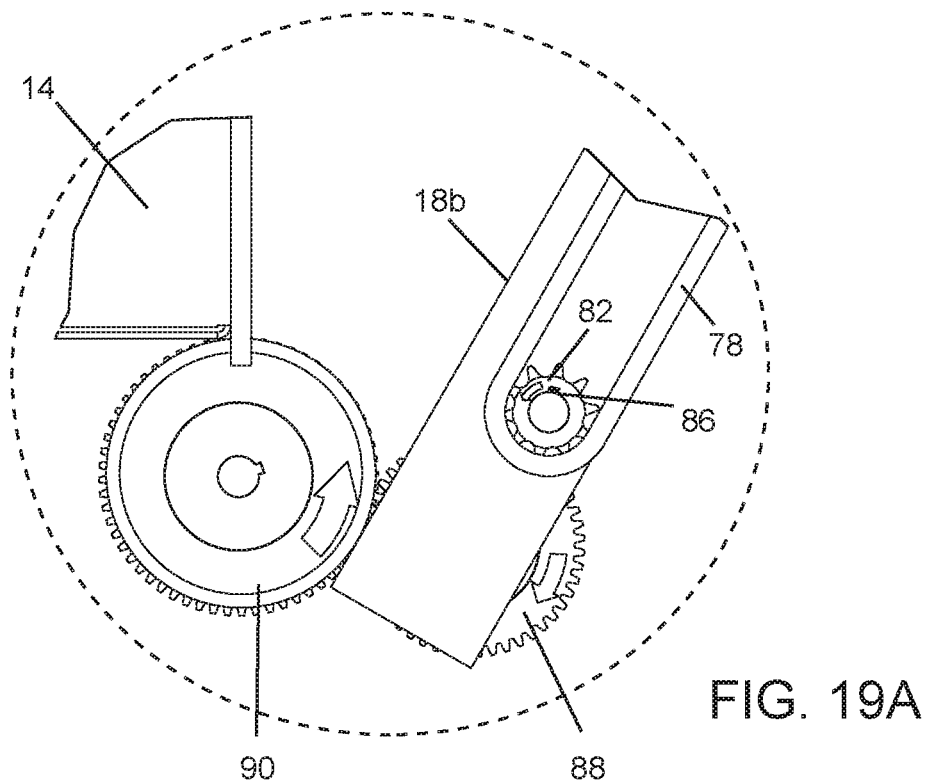
FIG. 19A is an enlarged view of the region designated 19A in FIG. 19.

Referring to FIGS. 19 and 19A, it will be appreciated that if the lift 72 is being stowed, the chain 78 actuates around the first sprocket 80 and the chain 78 rotates the second sprocket 82 counter-clockwise. Because the first spur gear 84 is fixedly coupled to the second sprocket 82 via the rotatable jack shaft 86, the first spur gear 84 also rotates counter-clockwise as viewed in FIGS. 19 and 19A. The counter-clockwise rotation of the first spur gear 84 causes the second spur gear 88 to rotate clockwise. The clockwise rotation of the second spur gear 88 causes the third spur gear 90 to rotate counter-clockwise. Because the third spur gear 90 is fixedly coupled to a portion of the rotatable hay pod support bar 20, the support bar 20 and the hay pod 14 also rotate counter-clockwise. The counter-clockwise rotation of the hay pod 14 increases the angle between the hay pod 14 and the pivot arm 18 as the lift 72 approaches the stowed configuration of FIG. 17. Conversely, if the system 70 is being deployed, the chain 78 actuates around the first sprocket 80 and the chain 78 rotates the second sprocket 82 clockwise as viewed in FIGS. 19 and 19A. Because the first spur gear 84 is fixedly coupled to the second sprocket 82 via the rotatable jack shaft 86, the first spur gear 84 also rotates clockwise. The clockwise rotation of the first spur gear 84 causes the second spur gear 88 to rotate counter-clockwise. The counter-clockwise rotation of the second spur gear 88 causes the third spur gear 90 to rotate clockwise. Because the third spur gear 90 is fixedly coupled to a portion of the rotatable hay pod support bar 20, the support bar 20 and the hay pod 14 also rotate clockwise. The clockwise rotation of the hay pod 14, as viewed in FIGS. 19 and 19A, decreases the angle between the hay pod 14 and the pivot arm 18 as the system 70 approaches the deployed configuration.

Referring now to the illustrative embodiments of FIGS. 21-24A, an integrated storage bin or hay pod elevator system 96 is provided for a transport trailer 12. The elevator system 96 includes a vertical raising and lowering mechanism, in the form of a hoist or lift 98 and a cable and spring hay pod actuation mechanism or assembly 100. In some ways the system 96 functions similarly to systems 10, 48, and 70 described above. Elevator system 96 differs primarily from systems 10, 48, and 70 in that with elevator system 96 the rotation of the hay pods is actuated by the cable and spring hay pod actuation assembly 100, as opposed to a linkage or chain-driven assembly (see FIGS. 18-20). The system 96 includes hay pods 120 that include an operable door 120a that can be opened and closed to access the contents 122 in the storage space in the interior of the hay pod 120 (FIG. 21A). It will be appreciated that the hay pod 14 of the illustrated embodiments 1-20 may be utilized with system 96, and that hay pods 120 may be used with the other embodiments as well.

Figure 21A:
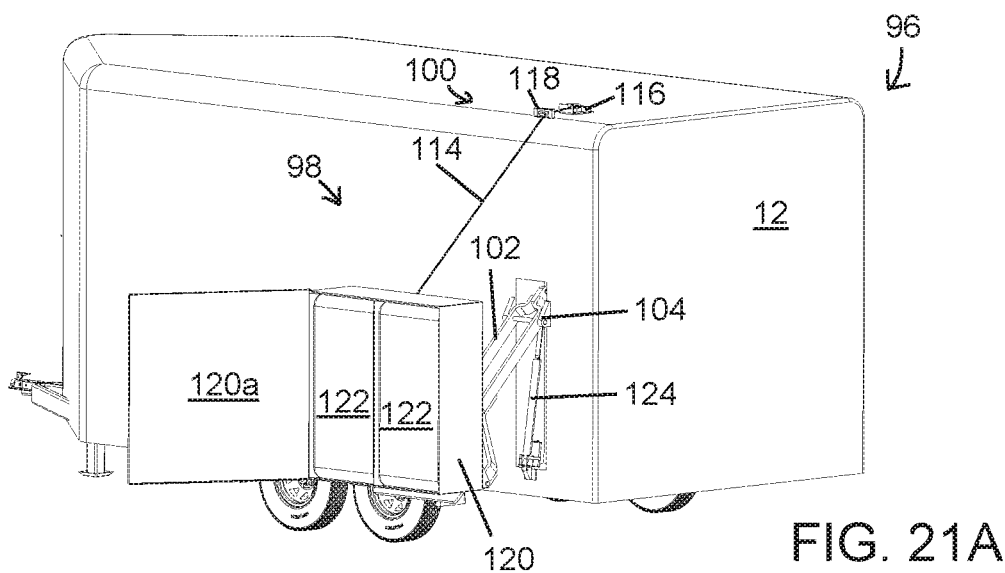
FIG. 21A-21C are rear-side perspective views of a cable assisted deployable hay pod elevator in accordance with the present invention, shown coupled to a transport trailer and depicting sequential steps of stowing the hay pod.
Figure 21B:
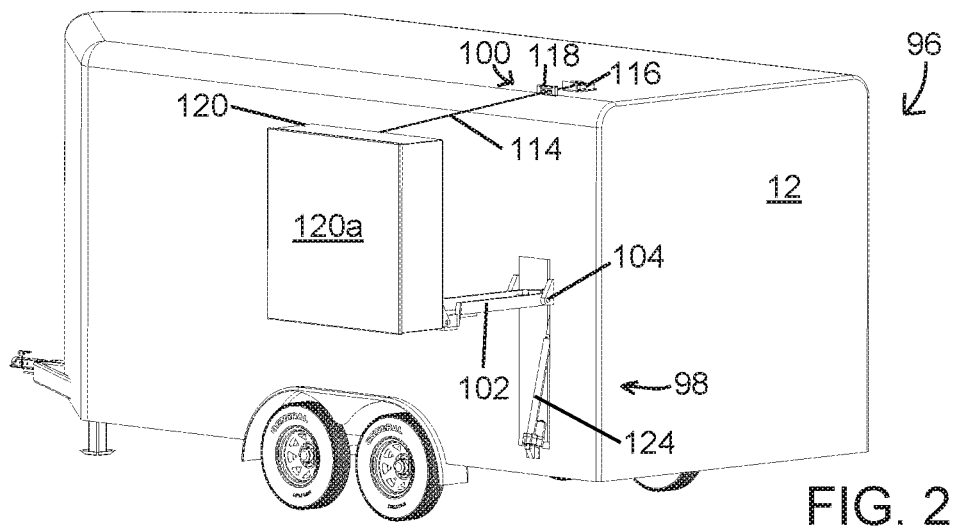
Figure 21C:
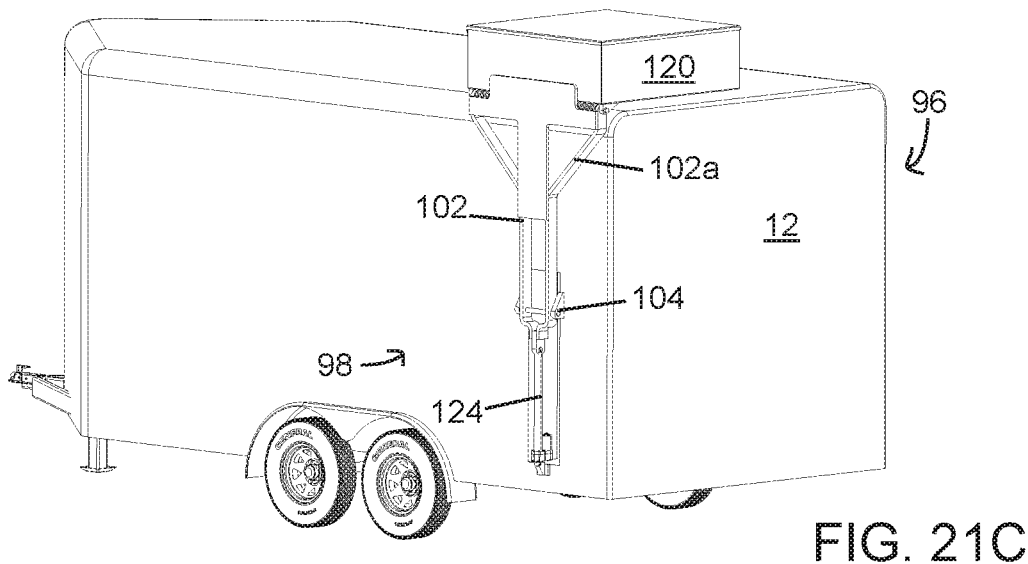

The elevator system 96 includes a pivot arm 102 pivotably coupled to a side wall of the trailer 12. The pivot arm 102 is pivotable to raise and lower the hay pod 14 between a deployed configuration proximate a side or back of the trailer 12, and a stowed configuration above the roof of the trailer 12. The pivot arm 102 is defined by a y-shaped frame 102a, as best shown in FIG. 21C, the frame 102a having sufficient rigidity to support the hay pod 14 as the system 96 actuates between the stowed and deployed configurations. While pivot arm 102 includes a more robust frame than that of pivot arm 18, pivot arm 102 functions substantially similar to that of pivot arm 18 described above. The pivot arm 102 is pivotably coupled to the trailer at a hinge 104. An actuation assist mechanism 124 is disposed at one end to a trailer mount frame 60 and at the opposite end to a fulcrum extension or lever arm portion 106 of the pivot arm 102 to assist a user in deployment and stowage of the hay pod 14 (FIG. 24A). The fulcrum extension 106 portion of the pivot arm 102 is positioned proximate the hinge 104 and opposite the hay pod 14. The assist mechanism 124 illustrated in FIGS. 21A-21C, 22, 23, 24-24A is a self-contained powered reciprocating linear biasing element in the form of an electric hydraulic cylinder that includes an integrated electric motor 125. While assist mechanism 124 includes an integrated motor 125, it will be appreciated that assist mechanism 124 of system 96 functions in similar fashion to the actuation assist mechanism 24 of the embodiments illustrated in FIGS. 1-20. Accordingly, it will be appreciated that various powered and non-powered actuators may be used for the assist mechanism 124, such as a gas spring or strut, a gas shock, a hydraulic strut, an electric linear actuator, or the like, similar to that described in previous embodiments above. A portion of the assist mechanism 124 and pivot arm 102 may be positioned inside of a trailer wall recess 28, depending on whether the system 96 is in the stowed or deployed configuration (see FIGS. 22 and 23).

A hinge 108 is disposed between the hay pod 14 and the distal end 102b of the pivot arm 102 to allow the hay pod 14 to rotate relative to the pivot arm 102. As best shown in FIG. 23A, the hinge 108 is defined as a coiled torsion spring 110 to assist in retaining a minimum angle between the hay pod 14 and the pivot arm 102 such that the hay pod 14 cannot collapse onto the pivot arm. A pivot stop or fence 112 disposed proximate the hinge 108 and the distal end 102b of the pivot arm 102 and limits the rotation of the hay pod 14 to a substantially perpendicular position relative to the pivot arm 102, such as shown in FIGS. 23-24. The torsion spring 110 and fence 112 coordinate to retain the hay pod 14 in a generally perpendicular orientation relative to the pivot arm 102. While the system 96 is illustrated with a single pivot arm 102, it will be appreciated that the lift 98 may include two or more pivot arms 102 and a cross bar between the pivot arms, similar to that of systems 10, 48, and 70 described above and may include two or more hay pods 14 supported at the cross bar.

As illustrated in FIGS. 22, 23, and 24, the hay pod 14 may be positioned at different angles relative to the pivot arm 102 depending on whether the hay pod 14 is in the deployed or stowed configuration. An extendable cable 114 is coupled between an upper portion of the trailer 12 and a portion of the hay pod 14 (FIGS. 21A, 21B, and 22-23). The free end of the cable 114 is fixed at a portion of the hay pod 14 and the opposite end is extendably disposed in a constant force cable retractor or winch apparatus 116 that is mounted at the roof of the trailer 12. The cable is routed through a guide 118 that is mounted at the edge of the roof and guides the cables between the winch 116 and the hay pod 114. The winch 116 maintains a constant force on the cable 114 and the hay pod 14 to counteract the spring force from the torsion spring 110. The spring 110, cable 114, and winch 116 cooperate to control the rotation of the hay pod 14 relative to the pivot arm 102 and to moderate the deployment and stowage actuation of the lift 98 by assisting the assist mechanism 124. As the hay pod 14 actuates, the cable 114 extends or retracts automatically. When the hay pod 14 is in the stowed position, the cable 114 is fully retracted and when the hay pod 14 is actuating, the cable 114 is paid out by the winch 116 until it is fully extended at a length that will pull the upper portion of the hay pod 14 toward the trailer sidewall such that the hay pod 14 is substantially upright when in the fully deployed configuration. Once the cable 114 is fully extended and as the hay pod 14 continues to lower, the cable 114 pulls on the upper portion of the hay pod 14, thus further engaging the torsion spring 110. The length of the cable is chosen as a function of the desired orientation of the hay pod 14 relative to the pivot arm 102. As the lift 98 raises the hay pod 14 from the fully deployed configuration (FIG. 22) the force from the cable 114 relaxes and the energy in the torsion spring 110 releases to return the hay pod 14 toward the fence 112. Once the hay pod 14 contacts the fence 112 the cable 114 begins to retract into the winch 116. Thus the cooperation of the spring 110, the cable 114, and winch 116 automatically position the hay pod 14 relative to the pivot arms for use in the deployed configuration. Optionally, a locking pin may be disposed with the pivot arm 102, the hay pod 14, and the hinge 108 to allow a user to lock or secure the hay pod 14 relative to the pivot arm 102. The locking pin may be a spring pin, such as a spring loaded quick release pin or a locking pull pin latch.

As noted above, the deployable storage systems described herein are not necessarily limited to providing storage for livestock feed and tack. With little or no modification, storage systems may be implemented for different purposes and in different vehicular or even non-vehicular applications, without departing from the spirit and scope of the present invention. Thus, it will be understood that references to horses or other livestock herein are for purposes of providing examples of applications and features of the disclosed embodiments, and are not intended to limit the invention to livestock transport and supply applications. In addition, while the various embodiments are described with reference to a towable trailer, it will be appreciated that the principles of the present invention may be adapted to cargo vans, trucks, and self-powered recreational vehicles including boats, and even to stationary structures such as sheds and homes where vertical storage or material handling is desired, without departing from the spirit and scope of the present invention.

Thus, the deployable hay pod elevator system of the present invention is installed onto or integrated with a transport trailer such as a livestock trailer, or with substantially any other self-powered vehicle, towable vehicle, and even stationary applications (e.g., inside of barns), if desired. The deployable hay pod elevator system may include a powered deployment mechanism, such as a linear actuator or cable winch system, which enables manual or powered deployment and stowage of the hay pod with little or no lifting required by the operator. Various deployment assistance mechanisms are provided for assisting the powered deployment mechanism to deploy or stow the hay pod, including torsion springs, cable winches, linear actuators, chain drive assemblies, and/or linkage bar assemblies. The lift is operable to perform most of the deployment and stowage steps for the elevator with different levels of automation, actuation, and sensing available as desired. The linkage assemblies, cable and winch systems, and/or chain driven actuation assistance assemblies are provided to pivot the hay pods relative to the elevator system to orient the hay pods in a desired position when stowed or deployed to allow access to users or animals.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A deployable supply elevator system for a transport trailer, said elevator system comprising:
    a vertical raising and lowering mechanism comprising a pivot arm pivotably coupled at a central portion of an upright wall of the trailer, said vertical raising and lowering mechanism defining an arcuate travel path proximate the trailer and extending from an upper portion of the trailer to a lower portion of the trailer proximate a ground surface adjacent the trailer;
    a deployable supply handling platform coupled at a distal end of said pivot arm and movable along said arcuate travel path; and
    a handling platform actuation mechanism comprising a linkage assembly operably disposed along said pivot arm and coupled between said platform and the trailer, said handling platform actuation mechanism configured to change an orientation of said platform relative to said pivot arm and the upright wall of the trailer;
    wherein said raising and lowering mechanism is selectively operable to raise and lower said platform along said arcuate travel path;
    wherein when said elevator system is in a deployed configuration said platform is upright and positioned proximate the ground surface adjacent the trailer and when said elevator system is in a stowed configuration said platform is horizontal and positioned above the upper portion of the trailer.

2. The deployable supply elevator system of claim 1, wherein said raising and lowering mechanism comprises an actuation assist mechanism coupled at one end to a portion of the trailer and at an opposite end to a portion of said pivot arm, wherein said assist mechanism is operable to assist in deployment and stowage of said elevator system.

3. The deployable supply elevator system of claim 2, wherein said actuation assist mechanism comprises a powered hydraulic cylinder.

4. The deployable supply elevator system of claim 1, wherein an angle between said platform and said pivot arm is greater at the stowed configuration than it is at the deployed configuration.

5. The deployable supply elevator system of claim 1, wherein said linkage assembly comprises a linkage rod pivotably coupled at one end to a portion of said raising and lowering mechanism proximate a side of the trailer and at an opposite end to a pivot actuation link that is pivotably coupled to distal portion of said pivot arm, wherein said platform is fixedly coupled to said pivot actuation link, said linkage rod is configured to transfer an actuation force to said pivot actuation link such that said platform rotates relative to said pivot arm as said elevator system is moved between the deployed and stowed configurations.

6. The deployable supply elevator system of claim 5, wherein said linkage rod is coupled to said raising and lowering mechanism at a location that is spaced apart from the location where said pivot arm is coupled to the trailer, such that actuation of said raising and lowering mechanism automatically imparts an actuation force to said linkage rod.

7. The deployable supply elevator system of claim 1, further comprising a handling platform support bar configured to support at least a portion of said platform, wherein said platform is rotatably coupled proximate a distal end of said pivot arm and fixedly coupled to said handling platform support bar.

8. The deployable supply elevator system of claim 7, wherein said linkage assembly comprises:
    an actuation bracket fixedly coupled to a portion of said handling platform support bar; and
    a linkage rod pivotably coupled at one end proximate a sidewall of the trailer and at an opposite end to said actuation bracket;
    wherein said actuation bracket is configured to rotate said handling platform support bar relative to said pivot arm in response to a movement of said pivot arm relative to the trailer.

9. The deployable supply elevator system of claim 8, wherein said linkage rod is coupled to the trailer at a location that is spaced apart from the location where said pivot arm is coupled to the trailer, such that actuation of said raising and lowering mechanism automatically imparts an actuation force to said linkage rod.

10. The deployable supply elevator system of claim 1, wherein said pivot arm is pivotable greater than ninety degrees relative to the upright wall of the trailer.

11. A deployable supply elevator system for a transport trailer, said elevator system comprising:
    a vertical raising and lowering mechanism comprising a pivot arm pivotably coupled at a central portion of an upright wall of the trailer, said raising and lowering mechanism defining an arcuate travel path alongside the upright wall, said arcuate travel path extending from a lower region of the wall to above a roof of the trailer;
    a supply handling platform coupled to a distal end of said pivot arm; and
    a handling platform actuation mechanism comprising a chain-driven actuation assembly and configured to change an orientation of said platform relative to said pivot arm and the upright wall of the trailer;
    said raising and lowering mechanism is selectively operable to raise and lower said platform along said arcuate travel path;
    wherein when said elevator system is in a deployed configuration said platform is upright and positioned proximate the lower region of the wall, and when said elevator system is in a stowed configuration said platform is horizontal and positioned above an upper portion of the trailer.

12. The deployable supply elevator system of claim 11, wherein said chain-driven actuation assembly comprises a chain configured to drive a plurality of sprockets and a plurality of gears disposed along said pivot arm in spaced arrangement such that as said elevator system is moved between the stowed and deployed configurations said chain-driven actuation mechanism automatically rotates said platform relative to said pivot arm.

13. The deployable supply elevator system of claim 12, further comprising a handling platform support bar configured to support at least a portion of said platform, wherein said handling platform support bar is rotatable relative to said pivot arm, said platform is fixedly coupled to said handling platform support bar, and one of said plurality of gears is fixedly coupled to said handling platform support bar and configured to automatically rotate said handling platform support bar relative to said pivot arm in response to a movement of said pivot arm relative to the trailer.

14. The deployable supply elevator system of claim 11, further comprising a handling platform support bar rotatable relative to said pivot arm and configured to support at least a portion of said platform, wherein said platform is fixedly coupled to said handling platform support bar, and wherein said chain-driven actuation mechanism comprises a fixed first sprocket disposed at said raising and lowering mechanism proximate a side portion of the trailer, a rotatable second sprocket coupled at a distal end of said pivot arm, a chain routed around said first sprocket and said second sprocket and configured to rotate said second sprocket in response to an actuation of said chain due to movement of said raising and lowering mechanism, said second sprocket fixedly coupled to a rotatable first spur gear that intermeshes with a second spur gear that is disposed proximate the distal end of said pivot arm and adjacent to said first spur gear, said second spur gear intermeshes with a third spur gear that is fixedly disposed on a portion of said handling platform support bar, wherein as said second sprocket is rotated, said first spur gear is also rotated, wherein as said first spur gear is rotated, said second spur gear is rotated in an opposite direction of rotation relative to said first spur gear, wherein as said second spur gear is rotated, said third spur gear is rotated in an opposite direction of rotation relative to said second spur gear, as said third spur gear is rotated said handling platform support bar and said platform are rotated relative to said pivot arm.

15. The deployable supply elevator system of claim 11, wherein said raising and lowering mechanism comprises an actuation assist mechanism coupled at one end to a portion of the trailer and at an opposite end to a portion of said pivot arm, said assist mechanism configured to assist in deployment and stowage of said elevator system.

16. The deployable supply elevator system of claim 11, wherein an angle between said platform and said pivot arm is greater at the stowed configuration than it is at the deployed configuration.

17. A deployable supply elevator system for a transport trailer, said elevator system comprising:

a deployable supply handling platform;

a vertical raising and lowering mechanism comprising a pivot arm that is coupled at one end at a central portion of an upright wall of the trailer and at an opposite end to said platform, wherein said platform is rotatable relative to said pivot arm;

an actuation assist mechanism coupled at one end to a portion of the trailer and at an opposite end to a portion of said pivot arm, said assist mechanism selectively operable to raise and lower said raising and lowering mechanism; and a handling platform actuation mechanism comprising an extendable cable and a winch apparatus configured to rotate said platform relative to said pivot arm and the upright wall of the trailer in response to raising and lowering said pivot arm;

wherein when said elevator system is in a deployed configuration said platform is upright and positioned proximate the ground surface adjacent the trailer and when said elevator system is in a stowed configuration said platform is horizontal and positioned above an upper portion of the trailer.

18. The deployable supply elevator system of claim 17, wherein said platform is pivotable relative to said pivot arm and said elevator system further comprises a torsion spring disposed between said platform and said pivot arm and configured to support said platform at an angle relative to said pivot arm as said elevator system moves between the stowed and deployed configurations.

19. The deployable supply elevator system of claim 17, wherein an angle between said platform and said pivot arm is greater at the stowed configuration than it is at the deployed configuration.

20. The deployable supply elevator system of claim 17, wherein a free end of said cable is coupled to said platform and an opposite end of said cable is retractably disposed in said winch apparatus, said winch apparatus configured to automatically pay out or retract said cable as said elevator system moves between the stowed and deployed configurations.

* * * * *